(12) United States Patent
Giuliano

(10) Patent No.: US 10,404,162 B2
(45) Date of Patent: *Sep. 3, 2019

(54) DC-DC CONVERTER WITH MODULAR STAGES

(71) Applicant: pSemi Corporation, San Diego, CA (US)

(72) Inventor: David Giuliano, Brookline, MA (US)

(73) Assignee: pSemi Corporation, San Diego, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 15/813,546

(22) Filed: Nov. 15, 2017

(65) Prior Publication Data

US 2018/0145587 A1 May 24, 2018

Related U.S. Application Data

(63) Continuation of application No. 15/068,985, filed on Mar. 14, 2016, now Pat. No. 9,882,471, which is a
(Continued)

(51) Int. Cl.
*H02M 3/07* (2006.01)
*H02M 3/158* (2006.01)
(Continued)

(52) U.S. Cl.
CPC ............ *H02M 3/07* (2013.01); *H02M 3/158* (2013.01); *H02M 7/25* (2013.01); *H02M 3/1582* (2013.01);
(Continued)

(58) Field of Classification Search
CPC ... H02M 2001/007; H02M 2001/0045; H02M 3/156; H02M 3/158; H02M 3/1588; G05F 1/563
See application file for complete search history.

(56) References Cited

U.S. PATENT DOCUMENTS 3,818,306 A * 6/1974 Marini .................. H02M 3/156
363/15
4,214,174 A 7/1980 Dickson
(Continued)

FOREIGN PATENT DOCUMENTS

CN 101636702 1/2010
CN 101647182 2/2010
(Continued)

OTHER PUBLICATIONS

O. Abutbul et al. "Step-Up Switching-Mode Converter With High Voltage Gain Using a Switched-Capacitor Circuit" *IEEE Transactions on Circuits and Systems I.*, vol. 50, pp. 1098-1102, Aug. 2003.
(Continued)

*Primary Examiner* — Gary L Laxton
(74) *Attorney, Agent, or Firm* — Occhiuti & Rohlicek LLP

(57) ABSTRACT

An apparatus for processing electric power includes a power-converter having a path for power flow between first and second power-converter terminals. During operation the first and second power-converter terminals are maintained at respective first and second voltages. Two regulating-circuits and a switching network are disposed on the path. The first regulating-circuit includes a magnetic-storage element and a first-regulating-circuit terminal. The second regulating-circuit includes a second-regulating-circuit terminal. The first-regulating-circuit terminal is connected to the first switching-network-terminal and the second-regulating-circuit terminal is connected to the second switching-network-terminal. The switching network is transitions between a first switch-configuration and a second switch-configuration. In the first switch-configuration, charge accumulates in the first charge-storage-element at a first rate. Conversely, in the second switch-configuration, charge is depleted from the
(Continued)

first charge-storage-element at a second rate. These rates are constrained by the magnetic-storage element.

20 Claims, 22 Drawing Sheets

Related U.S. Application Data continuation of application No. 14/513,747, filed on Oct. 14, 2014, now Pat. No. 9,362,826, which is a continuation of application No. 13/771,904, filed on Feb. 20, 2013, now Pat. No. 8,860,396, which is a continuation of application No. PCT/US2012/036455, filed on May 4, 2012.

(60) Provisional application No. 62/132,701, filed on Mar. 13, 2015, provisional application No. 61/482,838, filed on May 5, 2011, provisional application No. 61/548,360, filed on Oct. 18, 2011, provisional application No. 61/577,271, filed on Dec. 19, 2011.

(51) Int. Cl.
  *H02M 7/25* (2006.01)
  *H02M 1/00* (2006.01)

(52) U.S. Cl.
  CPC *H02M 2001/007* (2013.01); *H02M 2003/077* (2013.01)

(56) References Cited

U.S. PATENT DOCUMENTS

| | | | |
|---|---|---|---|
| 4,812,961 A | 3/1989 | Essaff et al. | |
| 5,006,782 A * | 4/1991 | Pelly | H02M 3/158 323/225 |
| 5,132,606 A | 7/1992 | Herbert | |
| 5,301,097 A | 4/1994 | McDaniel | |
| 5,557,193 A | 9/1996 | Kajimoto | |
| 5,717,581 A | 2/1998 | Canclini | |
| 5,737,201 A | 4/1998 | Meynard et al. | |
| 5,761,058 A | 6/1998 | Kanda et al. | |
| 5,801,987 A | 9/1998 | Dinh | |
| 5,812,017 A | 9/1998 | Golla et al. | |
| 5,907,484 A | 5/1999 | Kowshik et al. | |
| 5,978,283 A | 11/1999 | Hsu et al. | |
| 6,107,864 A | 8/2000 | Kazuhiko et al. | |
| 6,400,579 B2 | 6/2002 | Cuk | |
| 6,476,666 B1 | 11/2002 | Palusa et al. | |
| 6,486,728 B2 | 11/2002 | Kleveland | |
| 6,501,325 B1 | 12/2002 | Meng | |
| 6,504,422 B1 | 1/2003 | Rader et al. | |
| 6,650,552 B2 | 11/2003 | Takagi et al. | |
| 6,759,766 B2 | 7/2004 | Hiratsuka et al. | |
| 6,927,441 B2 | 8/2005 | Pappalardo et al. | |
| 6,980,181 B2 | 12/2005 | Sudo | |
| 7,071,660 B2 | 7/2006 | Xu et al. | |
| 7,135,847 B2 | 11/2006 | Taurand | |
| 7,145,382 B2 | 12/2006 | Ker et al. | |
| 7,190,210 B2 | 3/2007 | Azrai et al. | |
| 7,224,062 B2 | 5/2007 | Hsu | |
| 7,239,194 B2 | 7/2007 | Azrai et al. | |
| 7,250,810 B1 | 7/2007 | Tsen | |
| 7,408,330 B2 | 8/2008 | Zhao | |
| 7,511,978 B2 | 3/2009 | Chen et al. | |
| 7,595,682 B2 | 9/2009 | Lin et al. | |
| 7,616,467 B2 | 11/2009 | Mallwitz | |
| 7,724,551 B2 | 5/2010 | Yanagida et al. | |
| 7,777,459 B2 | 8/2010 | Williams | |
| 7,782,027 B2 | 8/2010 | Williams | |
| 7,786,712 B2 | 8/2010 | Williams | |
| 7,807,499 B2 | 10/2010 | Nishizawa | |
| 7,812,579 B2 | 10/2010 | Williams | |
| 7,907,430 B2 | 3/2011 | Kularatna et al. | |
| 7,928,705 B2 | 4/2011 | Hooijschuur et al. | |
| 7,977,921 B2 | 7/2011 | Bahai et al. | |
| 7,999,601 B2 | 8/2011 | Schlueter et al. | |
| 8,018,216 B2 | 9/2011 | Kakehi | |
| 8,040,174 B2 | 10/2011 | Likhterov | |
| 8,048,766 B2 | 11/2011 | Joly et al. | |
| 8,089,788 B2 | 1/2012 | Rinkle | |
| 8,106,597 B2 | 1/2012 | Mednik et al. | |
| 8,111,054 B2 | 2/2012 | Yen et al. | |
| 8,159,091 B2 | 4/2012 | Yeates | |
| 8,193,604 B2 | 6/2012 | Lin et al. | |
| 8,212,541 B2 | 7/2012 | Perreault et al. | |
| 8,330,436 B2 | 12/2012 | Oraw et al. | |
| 8,339,184 B2 | 12/2012 | Kok et al. | |
| 8,350,549 B2 | 1/2013 | Kitabatake | |
| 8,384,467 B1 | 2/2013 | O'Keeffe et al. | |
| 8,395,914 B2 | 3/2013 | Klootwijk et al. | |
| 8,423,800 B2 | 4/2013 | Huang et al. | |
| 8,456,874 B2 | 6/2013 | Singer et al. | |
| 8,503,203 B1 | 8/2013 | Szczeszynski et al. | |
| 8,582,333 B2 | 11/2013 | Oraw et al. | |
| 8,856,562 B2 | 10/2014 | Huang et al. | |
| 9,882,471 B2 * | 1/2018 | Giuliano | H02M 3/07 |
| 2003/0169096 A1 | 9/2003 | Hsu et al. | |
| 2003/0227280 A1 | 12/2003 | Vinciarelli | |
| 2004/0041620 A1 | 3/2004 | D'Angelo et al. | |
| 2005/0007184 A1 | 1/2005 | Kamijo | |
| 2005/0207133 A1 | 9/2005 | Pavier et al. | |
| 2006/0139021 A1 | 6/2006 | Taurand | |
| 2007/0210774 A1 | 9/2007 | Kimura et al. | |
| 2007/0230221 A1 | 10/2007 | Lim et al. | |
| 2007/0296383 A1 | 12/2007 | Xu et al. | |
| 2008/0150621 A1 | 6/2008 | Lesso et al. | |
| 2008/0157732 A1 | 7/2008 | Williams | |
| 2008/0157733 A1 | 7/2008 | Williams | |
| 2008/0239772 A1 | 10/2008 | Oraw et al. | |
| 2009/0102439 A1 | 4/2009 | Williams | |
| 2009/0257211 A1 | 10/2009 | Kontani et al. | |
| 2009/0278520 A1 | 11/2009 | Perreault et al. | |
| 2010/0110741 A1 | 5/2010 | Lin et al. | |
| 2010/0140736 A1 | 6/2010 | Lin et al. | |
| 2010/0202161 A1 | 8/2010 | Sims et al. | |
| 2010/0214746 A1 | 8/2010 | Lotfi et al. | |
| 2010/0244189 A1 | 9/2010 | Klootwijk et al. | |
| 2010/0244585 A1 | 9/2010 | Tan et al. | |
| 2011/0101884 A1 | 5/2011 | Kim et al. | |
| 2011/0163414 A1 | 7/2011 | Lin et al. | |
| 2012/0146177 A1 | 6/2012 | Choi et al. | |
| 2012/0243267 A1 | 9/2012 | Kassayan | |
| 2012/0249096 A1 | 10/2012 | Enenkel | |
| 2012/0313602 A1 | 12/2012 | Perreault et al. | |
| 2012/0326684 A1 | 12/2012 | Perreault et al. | |
| 2013/0049714 A1 | 2/2013 | Chiu | |
| 2013/0058141 A1 | 3/2013 | Oraw et al. | |
| 2013/0094157 A1 | 4/2013 | Giuliano | |
| 2013/0154600 A1 | 6/2013 | Giuliano | |
| 2013/0181521 A1 | 7/2013 | Khlat | |
| 2014/0159681 A1 | 6/2014 | Oraw et al. | |

FOREIGN PATENT DOCUMENTS

| | | |
|---|---|---|
| CN | 102055328 | 5/2011 |
| CN | 103650314 | 3/2014 |
| FR | 2852748 | 9/2004 |
| JP | 10327573 | 12/1998 |
| JP | 11235053 | 8/1999 |
| JP | 2002-233139 | 8/2002 |
| JP | 2010045943 | 2/2010 |
| WO | 2006093600 | 9/2006 |
| WO | 2009112900 | 9/2009 |
| WO | 2013059446 | 4/2013 |
| WO | 2013096416 | 6/2013 |
| WO | 2014154390 | 10/2014 |
| WO | 2014169186 | 10/2014 |

(56) References Cited

FOREIGN PATENT DOCUMENTS

OTHER PUBLICATIONS

Umeno et al. "A New Approach to Low Ripple-Noise Switching Converters on the Basis of Switched-Capacitor Converters" *IEEE International Symposium on Circuits and Systems*, vol. 2, pp. 1077-1080, Jun. 1991.

Axelrod et al. "Single-switch single-stage switched-capacitor buck converter", *Proc. of NORPIE 2004, 4th Nordic Workshop on Power and Industrial Electronics*, Jun. 2004.

Sun et al. "High Power Density, High Efficiency System Two-Stage Power Architecture for Laptop Computers", *Power Electronics Specialists Conference*, pp. 1-7, Jun. 2006.

R. D. Middlebrook, "Transformerless DC-to-DC Converters with Large Conversion Ratios" *IEEE Transactions on Power Electronics*, vol. 3, No. 4, pp. 484-488, Oct. 1988.

Wood et al, "Design, Fabrication and Initial Results of a 2g Autonomous Glider" *IEEE Industrial Electronics Society*, pp. 1870-1877, Nov. 2005.

T. A. Meynard, H. Foch, "Multi-Level Conversion: High Voltage Choppers and Voltage-Source Inverters," *IEEE Power Electronics Specialists Conference*, pp. 397-403, 1992.

Pilawa-Podgurski et al. "Merged Two-Stage Power Converter Architecture with Soft Charging Switched-Capacitor Energy Transfer" *39th IEEE Power Electronics Specialists Conference*, 2008.

Han et al. "A New Approach to Reducing Output Ripple in Switched-Capacitor-Based Step-Down DC-DC Converters" *IEEE Transactions on Power Electronics*, vol. 21, No. 6, pp. 1548-1555 Nov. 2006.

Lei et al. "Analysis of Switched-capacitor DC-DC Converters in Soft-charging Operation" *14$^{th}$ IEEE Workshop on Control and Modeling for Power Electronics*, pp. 1-7, Jun. 23, 2013.

Ng et al. "Switched Capacitor DC-DC Converter: Superior where the Buck Converter has Dominated" *PhD Thesis, UC Berkeley*, Aug. 17, 2011.

R. Pilawa-Podgurski and D. Perreault, "Merged Two-Stage Power Converter with Soft Charging Switched-Capacitor Stage in 180 nm CMOS," *IEEE Journal of Solid-State Circuits*, vol. 47, No. 7, pp. 1557-1567, Jul. 2012.

Ottman et al, "Optimized Piezoelectric Energy Harvesting Circuit using Step-Down Converter in Discontinuous Conduction Mode", IEEE Power Electronics Specialists Conference, pp. 1988-1994, 2002.

Ma et al, "Design and Optimization of Dynamic Power System for Self-Powered Integrated Wireless Sensing Nodes" ACM ISLPED '05 conference (published at pp. 303-306 of the proceedings).

Xu et al., "Voltage Divider and its Application in Two-stage Power Architecture," IEEE Twenty-First Annual IEEE Applied Power Electronics Conference and Exposition, pp. 499-504, Mar. 2006.

Markowski, "Performance Limits of Switched-Capacitor DC-DC Converters", IEEE PESC'95 Conference, 1995.

Texas Instruments data sheet for part TPS54310, "3-V to 6-V input, 3-A output synchronous-buck PWM switcher with integrated FETs", dated 2002-2005.

Linear Technology data sheet for part LTC3402, "2A, 3MHz Micropower Synchronous Boost Converter", 2000.

Starzyk et al., "A DC-DC Charge Pump Design Based on Voltage Doublers," IEEE Transactions on Circuits and Systems—I: Fundamental Theory and Applications, vol. 48, No. 3, Mar. 2001, pp. 350-359.

\* cited by examiner

DC-DC CONVERTER WITH MODULAR STAGES

CROSS-REFERENCE TO RELATED APPLICATIONS

The following applications are related to the present application by either 35 USC 120 or 25 USC 119.
  U.S. application Ser. No. 15/068,985, filed Mar. 14, 2016.
  U.S. Provisional Application No. 62/132,701, filed on Mar. 13, 2015.
  U.S. application Ser. No. 14/513,747, filed on Oct. 14, 2014 and which issued as U.S. Pat. No. 9,362,826 on Jun. 7, 2016.
  U.S. application Ser. No. 13/771,904, filed on Feb. 20, 2013, and which issued as U.S. Pat. No. 8,860,396 on Oct. 14, 2014.
  International Application PCT/US2012/036455, filed on May 4, 2012.
  U.S. Provisional Application No. 61/482,838, filed May 5, 2011.
  U.S. Provisional Application No. 61/548,360, filed Oct. 18, 2011.
  U.S. Provisional Application No. 61/577,271, filed Dec. 19, 2011.

The relationships between the above applications are set forth below. The applications are identified by serial number for brevity. Full bibliographic information is contained in the above list. Where a first application that "is a continuation" of a second, the applications in question are related by 35 USC 120. Where a first application "is a non-provisional" of a second, the applications are related by 35 USC 119.
  This application is a continuation of Ser. No. 15/068,985.
  Ser. No. 15/068,985 is a non-provisional of 62/132,701.
  Ser. No. 15/068,985 is a continuation-in-part of Ser. No. 14/513,747.
  Ser. No. 14/513,747 is a continuation of Ser. No. 13/771,904.
  Ser. No. 13/771,904 is a continuation PCT/US2012/036455.
  PCT/US2012/036455 is a non-provisional of 61/482,838.
  PCT/US2012/036455 is a non-provisional of 61/548,360.
  PCT/US2012/036455 is a non-provisional of 61/577,271.

The contents of the foregoing applications are incorporated herein by reference.

FIELD OF DISCLOSURE

This disclosure relates to power supplies, and in particular to power converters.

BACKGROUND

Many power converters include switches and one or more capacitors that are used, for example, to power portable electronic devices and consumer electronics. Switch-mode power converters regulate the output voltage or current by switching energy storage elements (i.e. inductors and capacitors) into different electrical configurations using a switch network. Switched capacitor converters are switch-mode power converters that primarily use capacitors to transfer energy. In such converters, the number of capacitors and switches increases as the transformation ratio increases. Switches in the switch network are usually active devices that are implemented with transistors. The switch network may be integrated on a single or on multiple monolithic semiconductor substrates, or formed using discrete devices.

Typical DC-DC converters perform voltage transformation and output regulation. This is usually done in a single-stage converter such as a buck converter. However it is possible to split these two functions into two specialized stages, namely a transformation stage, such as a switching network, and a separate regulation stage, such as a regulating circuit. The transformation stage transforms one voltage into another, while the regulation stage ensures that the voltage and/or current output of the transformation stage maintains desired characteristics.

SUMMARY

In one aspect, the invention features an apparatus for electric power conversion. Such an apparatus includes a converter having an input terminal and an output terminal. The converter includes a regulating circuit having an inductance, and switching elements connected to the inductance. These switching elements are controllable to switch between switching configurations. The regulating circuit maintains an average DC current through the inductance. The converter also includes a switching network having an input port and an output port. This switching network includes charge-storage elements and switching elements connected to the charge-storage elements. These switching elements are controllable to switch between switch configurations. In one switch configuration, the switching elements form a first arrangement of charge-storage elements in which a charge-storage element is charged through one of the input port and the output port of the switching network. In another configuration, the switching elements form a second arrangement of charge-storage elements in which a charge-storage element is discharged through one of the input port and output port of the switching network. The switching network and regulating circuit also satisfy at least one of the following configurations: (1) the regulating circuit is connected between the output terminal of the converter and the switching network, the switching network being an adiabatically charged switching network; (2) the regulating circuit is connected between the output terminal of the converter and the switching network, wherein either the switching network is a multi-phase switching network, the switching network and the regulating circuit are bidirectional, or the regulating circuit is multi-phase; (3) the regulating circuit is connected between the input terminal of the converter and an input port of the switching network, the switching network being an adiabatically charged switching network; (4) the regulating circuit is connected between the input terminal of the converter and an input port of the switching network, and either the switching network is a multi-phase switching network, the switching network and the regulating circuit are bidirectional, or the regulating circuit is multi-phase; (5) the switching network is connected between the regulating circuit and an additional regulating circuit; or (6) the regulating circuit is connected between the switching network and an additional switching network.

Embodiments of the invention include those in which the switching network includes a reconfigurable switching network and those in which the switching network includes a multi-phase switching network.

Other embodiments include those in which the regulating circuit includes a bidirectional regulating circuit those in which the regulating circuit includes a multi-phase regulating circuit, those in which the regulating circuit is bidirectional and includes a switch-mode power converter, those in which the regulating circuit is bidirectional regulating circuit and includes a resonant power converter, those in which the regulating circuit is connected to an output of the switching network, and those in which the regulating circuit is connected between the output terminal of the converter and the switching network, the switching network being an adiabatically charged switching network.

In other embodiments, the regulating circuit is connected between the output terminal of the converter and a switching network, and either the switching network is a multi-phase switching network, the switching network and the regulating circuit are bidirectional, or the regulating circuit is multi-phase.

In other embodiments, the regulating circuit is connected between the input terminal of the converter and an input port of the switching network, the switching network being an adiabatically charged switching network.

In yet other embodiments, the regulating circuit is connected between the input terminal of the converter and an input port of the switching network, and either the switching network is a multi-phase switching network, the switching network and the regulating circuit are bidirectional, or the regulating circuit is multi-phase.

Among the embodiments of the invention are those in which the switching network is connected between the regulating circuit and an additional regulating circuit, and those in which the regulating circuit is connected between the switching network and an additional switching network.

In additional embodiments, the switching network is configured as an AC switching network. Among these embodiments are those that also include a power-factor correction circuit connected to the AC switching network. Among these embodiments are those in which this power-factor correction circuit is connected between the AC switching network and the regulating circuit.

In another aspect, the invention features an apparatus including a converter having an input terminal and an output terminal. The converter includes a switching network having an input port and output port. This switching network includes charge-storage elements, and switching elements connected to the charge-storage elements. The switching elements are controllable to arrange the charge-storage elements into a selected configuration. In at least one configuration, the switching elements form a first group of charge-storage elements for discharging the charge-storage elements through the output port of the switching network. In another, the switching elements form a second group of charge-storage elements for charging the charge-storage elements through the input port of the switching network. The converter also includes a bi-directional regulating circuit connected between at least one of an input terminal of the converter and an input port of the switching network and an output terminal of the converter and an output port of the switching network.

In some embodiments, the switching network includes a multi-phase switching network.

Also included among the embodiments are those in which the bidirectional regulating circuit includes a buck/boost circuit and those in which the bidirectional regulating circuit includes a split-pi circuit.

In another aspect, the invention features a converter having an input terminal and an output terminal. The converter includes a switching network having an input port and output port, charge-storage elements, and switching elements connected to the charge-storage elements for arranging the charge-storage elements into one of a plurality of configurations. In one configuration, the switching elements form a first group of charge storage-elements for discharging the charge-storage elements through the output port of the switching network. In another configuration, the switching elements form a second group of charge-storage elements for charging the charge-storage elements through the input port of the switching network. The converter further includes a regulating circuit configured to provide a stepped-up voltage and connected between the output terminal of the converter and an output port of the switching network.

In yet another aspect, the invention features an apparatus having an input terminal and output terminal, and a switching network having an input port and output port, charge-storage elements, and switching elements connected to the charge-storage elements. The switching elements are controllable for causing the switching elements to be arranged in a plurality of configurations. In one configuration, the switching elements form a first group of charge-storage elements for discharging the charge-storage elements through the output port of the switching network. In another configuration the switching elements form a second group of charge-storage elements for charging the charge-storage elements through the input port of the switching network. The apparatus further includes a source regulating circuit connected between an input terminal of the converter and an input port of the switching network.

Some embodiments also include a load regulating circuit connected between an output terminal of the converter and an output port of the switching network.

In another aspect, the invention features a manufacture including multiple switching networks and regulating circuits having inputs and outputs that permit modular interconnections thereof for assembly of a DC-DC converter.

In some embodiments, at least one switching network includes a switched capacitor network. Among these are those in which the switched capacitor network includes an adiabatically charged switched capacitor network. These embodiments also include those in which the adiabatically charged switched capacitor network includes a cascade multiplier. In some of these embodiments, the cascade multiplier is driven by complementary clocked current sources.

In other embodiments, at least one regulating circuit includes a linear regulator.

Embodiments also include those in which the DC-DC converter includes series-connected switched capacitor networks, and those in which the DC-DC converter includes multiple regulating circuits that share a common switching network.

In another aspect, the invention features an apparatus for electric power conversion. Such an apparatus includes a converter having an input terminal and an output terminal. The converter includes a regulating circuit, and a switching network. The regulating circuit maintains an average DC current through an inductance thereof. The switching network, which has an input port and an output port, has charge-storage elements. Switching elements of the switching network connect to these charge-storage elements. The switching elements are controllable to switch between switch configurations. In one switch configuration, the switching elements form a first arrangement of charge-storage elements in which a charge-storage element is charged through a first port of the switching network and in another configuration, the switching elements form a second arrangement of charge-storage elements in which a charge-storage element is discharged through a second port of the switching network. The first and second ports are chosen from the input and output ports.

There are six converter configurations within the scope of the invention. In a first configuration, the regulating circuit is connected between the output terminal of the converter and the switching network is an adiabatically charged switching circuit. In a second configuration, the regulating circuit is connected between the output terminal of the converter and the switching network, and the converter satisfies one or more second-configuration properties to be defined below. In a third configuration, the regulating circuit is connected between the input terminal of the converter and an input port of the switching network, and the switching network is an adiabatically charged switching network. In a fourth configuration, the regulating circuit is connected between the input terminal of the converter and an input port of the switching network, and the converter satisfies one or more fourth-configuration properties to be described below. In a fifth configuration, the switching network is connected between the regulating circuit and an additional regulating circuit. Finally, in a sixth configuration, the regulating circuit is connected between the switching network and an additional switching network. The properties, one or more of which are satisfied in the second and fourth configurations, are as follows: the first property is that the switching network is a multi-phase switching network, the second property is that the switching network and the regulating circuit are bidirectional, and the third property is that the regulating circuit is multi-phase.

In some embodiments, the switching network comprises a reconfigurable switching network. In others, it comprises a multi-phase switching network.

Embodiments also include those in which the regulating circuit comprises a bidirectional regulating circuit. Among these are embodiments in which the regulating circuit comprises a switch-mode power converter, and those in which it comprises a resonant power converter.

Also among the embodiments are those in which the regulating circuit comprises a multi-phase regulating circuit, those in which the regulating circuit is configured to operate as a magnetic filter, and those in which the regulating circuit is connected to an output of the switching network.

In some embodiments, the converter is in the first configuration. In others, the converter is in the second configuration. In yet others, the converter is in the third configuration. Also included within the scope of the invention are embodiments in which the converter is in the fourth configuration, and embodiments in which the converter is in the sixth configuration.

In yet other embodiments, the converter is in the fifth configuration. Among these are the embodiments in which the additional regulating circuit of the fifth configuration is configured to operate as a magnetic filter. These can be implemented by using a buck converter as a regulator and making the duty cycle very long, so that the series inductor is virtually always connected. In the limiting case, the switch can be eliminated altogether.

Further embodiments include those in which the switching network is configured as an AC switching network.

Some embodiments feature a power-factor correction circuit connected to the AC switching network. Among these are embodiments in which the power-factor correction circuit is connected between the AC switching network and the regulating circuit.

In one aspect, the invention features an apparatus for processing electric power. Such an apparatus includes a power-converter having a path for power flow between a first power-converter terminal and a second power-converter terminal. During operation of the power-converter, the first power-converter terminal is maintained at a first voltage and the second power-converter terminal is maintained at a second voltage that is lower than the first voltage. The power-converter includes first and second regulating-circuits, and a switching network, all of which are disposed on the path. The switching network includes switches, a first charge-storage-element, and first and second switching-network-terminals. The first regulating-circuit includes a first magnetic-storage-element and a first-regulating-circuit terminal. The second regulating-circuit includes a second-regulating-circuit terminal. The power path includes the first-regulating-circuit terminal, the second-regulating-circuit terminal, the first switching-network-terminal, and the second switching-network-terminal. The first-regulating-circuit terminal is connected to the first switching-network-terminal and the second-regulating-circuit terminal is connected to the second switching-network-terminal. The switching network is configured to transition between a first switch-configuration and a second switch-configuration. When the switching network is in the first switch-configuration, charge accumulates in the first charge-storage-element at a first rate. Conversely, when the switching network is in the second switch configuration charge is depleted from the first charge-storage-element at a second rate. These two rates are constrained by the first magnetic-storage-element.

In some embodiments, the switching network further includes a second charge-storage-element. When the switching network is in the first switch-configuration, charge is depleted from the second charge-storage-element at a rate constrained by the first magnetic-storage-element. Conversely, when the switching network is in the second configuration, charge accumulates in the second charge-storage-element at a rate constrained by the first magnetic-storage-element. These rates can be equal or different.

In other embodiments, the second regulating-circuit includes a second magnetic-storage-element, and a switch connected to the magnetic-storage element, the switch being controllable to switch between at least two switching configurations.

Also included are embodiments in which the second regulating-circuit further includes a feedback loop for controlling operation of the switch in response to a measured output of the power converter.

In yet other embodiments, the first magnetic-storage-element includes a filter. In some of these embodiments, the filter has a resonant frequency.

Other embodiments include a third regulating-circuit, that is also connected to the switching network. Both the second and third regulating circuits have inductors. These inductors are coupled to each other. Another embodiment includes an inductor core that is shared by inductors in the second and third regulating circuits.

Also among the embodiments are those in which the first and second rates of charge transfer are equal.

In another aspect, the invention features a method for causing a power converter to process electric power. Such a method includes, on a power path for power flow between a first power-converter terminal and a second power-converter terminal, connecting a first-regulating-circuit terminal of a first regulating-circuit to a first switching-network-terminal of a first switching-network, and connecting a second-regulating-circuit terminal of the first regulating-circuit to a second switching-network-terminal of the first switching-network, using the second regulating-circuit, maintaining the first power-converter terminal at a first voltage, thereby maintaining the second power-converter terminal at a second voltage that is lower than the first voltage, using switches in the first switching-network, placing the first switching-network in a configuration for allowing charge to accumulate in the first charge-storage-element of the first switching-network, using energy stored in a magnetic field by a first magnetic-storage-element in the first regulating-circuit, constraining a rate of charge accumulation in a first charge-storage-element of the first switching-network, using the switches in the first switching-network, placing the first switching-network in a configuration for allowing charge to be depleted from the first charge-storage-element of the first switching-network, and, using energy stored by the first magnetic-storage-element in the first regulating-circuit, constraining a rate of charge depletion from the first charge-storage-element of the first switching-network.

Some practices include, while constraining a rate of charge depletion from the first charge-storage-element, constraining a rate of charge accumulation in a second charge-storage-element, and, while constraining a rate of charge accumulation into the first charge-storage-element, constraining a rate of charge depletion from the second charge-storage-element.

Yet other practices include controlling a switch connected to a magnetic-storage element of the second regulating-circuit in response to measured output of the power converter.

In some practices, the first magnetic-storage-element includes a filter. Among these, are practices of the invention in which the filter has a resonant frequency. An example of such a filter is an LC filter or an RLC filter.

Some practices involve a third regulating-circuit in addition to the two that are already present. The third regulating-circuit is connected to the switching network, and includes an inductor that is coupled to an inductor of the first regulating-circuit. In another embodiments, a third regulating-circuit connected to the switching network has an inductor that couples to an inductor in the first regulating-circuit with a common core.

Many kinds of switching network can be selected, including a reconfigurable switching-network, a multi-phase switching-network, a multi-phase series-parallel switching-network, a multi-phase multiple-stage switching network, a cascade multiplier, and a multiple stage switching network.

In addition, a variety of different regulating circuits can be used for at least one of the first and second regulating circuits. These include a bidirectional regulating-circuit, a multi-phase regulating-circuit, a switch-mode power converter, a resonant power converter, a buck converter, a boost converter, a buck/boost converter, a linear regulator, a Cuk converter, a fly-back converter, a forward converter, a half-bridge converter, a full-bridge converter, a magnetic-storage element, and a magnetic filter.

The fly-back converter can more specifically be a quasi-resonant fly-back converter, or an active-clamp fly-back converter, or an interleaved fly-back converter, or a two-switch fly-back converter. Likewise, the forward converter can be more specifically a multi-resonant forward converter, or an active-clamp forward converter, or an interleaved forward converter, or a two-switch forward converter. Lastly, the half-bridge converter can more specifically be an asymmetric half-bridge converter, or a multi-resonant half-bridge converter, or a LLC resonant half-bridge.

Some practices include configuring the switching network to be an AC switching network. These practices include those that also include controlling a power-factor of an output of the AC switching network, and those that also include connecting a power-factor correction circuit between the AC switching network and the first regulating-circuit.

Other practices also include varying switch configurations of the switching network at a frequency that is different from a frequency at which switching configuration of at least one of the first and second regulating-circuits is varied.

In another aspect, the invention features a non-transitory computer-readable medium that stores a data structure that is to be operated upon by a program executable on a computer system, wherein, when operated upon by such a program, the data structure causes at least a portion of a process for fabricating an integrated circuit that includes circuitry described by the data structure, wherein the circuitry described by the data structure includes a switching network that has been configured to be used with a power-converter having a path for power flow between a first power-converter terminal and a second power-converter terminal, wherein, during operation of the power-converter, the first power-converter terminal is maintained at a first voltage and the second power-converter terminal is maintained at a second voltage that is lower than the first voltage, wherein the power-converter comprises first and second regulating-circuits, and the switching network, all of which are disposed on the path, wherein the switching network comprises switches, and first and second switching-network-terminals, wherein the first regulating-circuit comprises a first magnetic-storage-element and a first-regulating-circuit terminal, wherein the second regulating-circuit comprises a second-regulating-circuit terminal, wherein the power path comprises the first-regulating-circuit terminal, the second-regulating-circuit terminal, the first switching-network-terminal, and the second switching-network-terminal, wherein the first-regulating-circuit terminal is to be connected to the first switching-network-terminal and the second-regulating-circuit terminal is to be connected to the second switching-network-terminal, wherein the switching network is configured to transition between a first switch-configuration and a second switch-configuration, wherein, when the switching network is in the first switch-configuration, charge accumulates in the first charge-storage-element at a first rate, wherein, when the switching network is in the second switch configuration charge is depleted from the first charge-storage-element at a second rate, and wherein the first rate and the second rate are constrained by the first magnetic-storage-element.

In one aspect, the invention features an apparatus for processing electric power. Such an apparatus includes a power-converter having a power path for power flow between first and second power-converter terminals maintained at corresponding first and second voltages during operation thereof. The second voltage is less than the first. A first regulating-circuit and a switching network are both on the power path. The switching network includes a first charge-storage-element, and first and second switching-network-terminals. The first regulating-circuit includes a first magnetic-storage-element and a first-regulating-circuit terminal. The power path includes the first-regulating-circuit terminal, the first switching-network-terminal, and the second switching-network-terminal with the first-regulating-circuit terminal being connected to the first switching-network-terminal. The switching network transitions between first and second switch-configurations. In the first charge accumulates in the first charge-storage-element at a first rate, and in the second switch configuration charge is depleted from the first charge-storage-element at a second rate. The first magnetic-storage-element constrains both of these rates. In some cases, the constraint is such that the rates are equal, whereas in others, the rates are different.

Some embodiments also include a second regulating-circuit disposed on the path. In these embodiments, the second regulating-circuit includes a second-regulating-circuit terminal that is also on the power path. This second-regulating-circuit terminal connects to the second switching-network-terminal.

In some embodiments, the switching network further includes a second charge-storage-element. Placing the switching network in the first switch-configuration depletes charge from the second charge-storage-element at a first rate. Placing the switching network in the second configuration accumulates charge in the second charge-storage-element at a second rate. The first magnetic-storage element constrains both of these rates.

Among the embodiments that have a second regulating-circuit are those in which the second regulating circuit includes a second magnetic-storage-element and a switch connected to the second magnetic-storage-element, the switch being controllable to switch between at least two switching configurations. Also among these embodiments are those in which the second regulating-circuit further includes a feedback loop for controlling operation of the switch in response to a measured output of the power converter.

In other embodiments, the first magnetic-storage-element includes a filter. Among these are embodiments in which the filter has a resonant frequency.

Among the embodiments that have two regulating circuits are those that have a third regulating circuit. In some of these embodiments, the third regulating-circuit connects to the switching network and has an inductor coupled to an inductor, and the second regulating-circuit includes an inductor that is coupled to the inductor of the third regulating-circuit. In others, the third regulating-circuit connects to the switching network and both the second and third regulating circuits include inductors that share the same inductor core. In embodiments that have coupled inductors, the inductors can be coupled such that the product of voltage and current at both inductors has the same sign or opposite signs.

The invention can be implemented with many kinds of switching networks. For example, in some embodiments, the switching network includes a reconfigurable switching network. As used herein, a reconfigurable switching network is one that has a set of switch configurations $\{\alpha_1, \alpha_2, \ldots \alpha n\}$ where n>2 and the switching network is able to transition between $\alpha_b$ and $\alpha_n$ for all m, n.

In others, it includes a multi-phase switching-network. In yet others, it includes a multi-phase multiple stage switching network, or a multiple stage switching network. Still other embodiments have switching networks that include a cascade multiplier.

The invention can also be implemented with many kinds of regulating circuit. These include bidirectional regulating-circuits, multi-phase regulating-circuits, switch-mode power converters, resonant power converters, a buck converter, a boost converter, a buck/boost converter, a linear regulator, a Cuk converter, a fly-back converter, a forward converter, a half-bridge converter, a full-bridge converter, a magnetic-storage element, and a magnetic filter.

In some embodiments, the switching network receives charge at an input thereof and outputs the charge at an output thereof. In these embodiments, transport of charge from the input to the output is carried out in more than one switching cycle.

Among the embodiments that feature a fly-back converter are those that include a quasi-resonant fly-back converter, an active-clamp fly-back converter, an interleaved fly-back converter, or a two-switch fly-back converter.

Among the embodiments that feature a forward converter are those that include a multi-resonant forward converter, an active-clamp forward converter, an interleaved forward converter, or a two-switch forward converter.

Among the embodiments that include a half-bridge converter are those that include an asymmetric half-bridge converter, a multi-resonant half-bridge converter, or a LLC resonant half-bridge.

The invention is not restricted to DC applications. For example, in some embodiments, the switching network is an AC switching network. These include embodiments with a power-factor correction circuit connected to the AC switching network. Among these are embodiments in which the power-factor correction circuit is between the AC switching network and the first regulating-circuit.

In some embodiments, the power-converter varies switch configurations of the switching network at a frequency that is different from a frequency at which switching configuration of at least one of the first and second regulating-circuits is varied.

In other embodiments, the switching network includes an asymmetric cascade multiplier having a plurality of DC nodes, each of which is available to deliver power at a voltage that is a multiple of the first voltage.

Yet other embodiments include a power-management integrated circuit into which the first regulating circuit is incorporated. In these embodiments, the power path includes a power-path section that extends out of the power-management integrated circuit and into the switching network.

Other embodiments include switches that have different physical areas.

Also among the embodiments are those in which the switch-widths of the switches are selected such that a time constant of charge transfer between charge-storage elements of the switching network is greater than or equal to a switching frequency at which the switching network changes state.

Yet other embodiments improve efficiency by having higher resistance switches. In these embodiments, the switching network is configured such that, at the switching-frequency of the switching network, increasing resistance of the switches reduces loss associated with current flowing within the switching network.

The various components of the apparatus need not share the same ground. In fact, one ground can float relative to the other.

As an example, in some embodiments, the first-regulating-circuit receives a first voltage difference and the second power-converter terminal outputs a second voltage difference. The first voltage difference is a difference between a first voltage and a second voltage that is less than the first voltage; the second voltage difference is a difference between a third voltage and a fourth voltage that is less than the third voltage. In these embodiments, a difference between the fourth voltage and the second voltage is non-zero. In other embodiments, the first-regulating-circuit receives a DC voltage difference, and the power converter receives an AC voltage difference. The DC voltage is a difference between a first voltage and a second voltage that is less than the first voltage; the AC voltage difference is a difference between a time-varying voltage and a constant voltage. A difference between the constant voltage and the second voltage is non-zero.

In another aspect, the invention features a method for causing a power converter to process electric power. Such a method includes, on a power path for power flow between a first power-converter terminal and a second power-converter terminal, connecting a first-regulating-circuit terminal of a first regulating-circuit to a first switching-network-terminal of a first switching-network, placing the first switching-network in a configuration for allowing charge to accumulate in the first charge-storage-element of the first switching-network, using energy stored in a magnetic field by a first magnetic-storage-element in the first regulating-circuit, constraining a rate of charge accumulation in a first charge-storage-element of the first switching-network, using the switches in the first switching-network, placing the first switching-network in a configuration for allowing charge to be depleted from the first charge-storage-element of the first switching-network, and, using energy stored by the first magnetic-storage-element in the first regulating-circuit, constraining a rate of charge depletion from the first charge-storage-element of the first switching-network.

Some practices further include connecting a second-regulating-circuit terminal of a second regulating-circuit to a second switching-network-terminal of the first switching-network, and using the second regulating-circuit, maintaining the first power-converter terminal at a first voltage, thereby maintaining the second power-converter terminal at a second voltage that is lower than the first voltage, using switches in the first switching-network.

Other practices include, while constraining a rate of charge depletion from the first charge-storage-element, constraining a rate of charge accumulation in a second charge-storage-element, and, while constraining a rate of charge accumulation into the first charge-storage-element, constraining a rate of charge depletion from the second charge-storage-element.

Yet other practices include controlling a switch connected to a magnetic-storage element of the second regulating-circuit in response to measured output of the power converter.

In some practices, the first magnetic-storage-element includes a filter. Among these are practices in which this filter has a resonant frequency.

Among the practices that use a second regulating circuit are those that include including a third regulating-circuit that is connected to the switching network. The third regulating-circuit includes an inductor, and the first regulating-circuit includes an inductor that is coupled to the inductor of the third regulating-circuit. The two inductors can be positively or negatively coupled.

Also among practices that use a second regulating circuit are those in which the second regulating circuit has an inductor core, and an inductor in a third regulating-circuit, which is connected to the switching network, shares this inductor core.

Some practices include constraining the rate of change so that the first rate and the second rate are equal. Others include constraining the rate of change so that the first rate and the second rate are unequal.

Practices of the invention contemplate a variety of switching networks. For example, practices of the invention include selecting the switching network to be reconfigurable switching-network, selecting it to be a multi-phase switching-network, selecting it to be a multi-phase series-parallel switching-network, selecting it to be a multi-phase multiple-stage switching network, selecting it to be a cascade multiplier, or selecting it to be a multiple stage switching network.

A variety of regulating circuits can be used in different practices. For example, practices of the invention include selecting a regulating circuit to be bidirectional, to be multi-phase, to be a switch-mode power converter, to be a resonant power converter, to be a magnetic-storage element, or to be a magnetic filter.

Other practices include selecting the switching network to be an AC switching network. Among these are practices that include controlling a power-factor of an output of the AC switching network. These include practices that include connecting a power-factor correction circuit between the AC switching network and the first regulating-circuit.

Yet other practices include varying switch configurations of the switching network at a frequency that is different from a frequency at which switching configuration of at least one of the first and second regulating-circuits is varied.

In addition, a variety of different regulating circuits can be used for at least one of the first and second regulating circuits. These include a bidirectional regulating-circuit, a multi-phase regulating-circuit, a switch-mode power converter, a resonant power converter, a buck converter, a boost converter, a buck/boost converter, a linear regulator, a Cuk converter, a fly-back converter, a forward converter, a half-bridge converter, a full-bridge converter, a magnetic-storage element, and a magnetic filter.

Practices that rely on a fly-back converter include those that rely on a quasi-resonant fly-back converter, an active-clamp fly-back converter, an interleaved fly-back converter, or a two-switch fly-back converter. Practices that rely on a forward converter include those that rely on a multi-resonant forward converter, an active-clamp forward converter, an interleaved forward converter, or a two-switch forward converter. Practices that rely on a half-bridge converter include those that rely on an asymmetric half-bridge converter, a multi-resonant half-bridge converter, or a LLC resonant half-bridge.

In another aspect, the invention features a non-transitory computer-readable medium that stores a data structure that is to be operated upon by a program executable on a computer system. When operated upon by such a program, the data structure causes at least a portion of a process for fabricating an integrated circuit. This integrated circuit includes circuitry described by the data structure. Such circuitry includes a switching network that has been configured to be used with a power-converter having a path for power flow between a first power-converter terminal and a second power-converter terminal. During the power-converter's operation of the power-converter, the first power-converter terminal is maintained at a first voltage and the second power-converter terminal is maintained at a second voltage that is lower than the first voltage. The power-converter includes a first regulating-circuit and the above-mentioned switching network, both of which are disposed on the path. The switching network includes switches, and first and second switching-network-terminals. Meanwhile, the first regulating-circuit includes a first magnetic-storage-element and a first-regulating-circuit terminal. The power path includes the first-regulating-circuit terminal, the first switching-network-terminal, and the second switching-network-terminal. The first-regulating-circuit terminal is to be connected to the first switching-network-terminal, and the switching network is configured to transition between first and second switch-configurations. When the switching network is in the first switch-configuration, charge accumulates in the first charge-storage-element at a first rate. When the switching network is in the second switch configuration, charge is depleted from the first charge-storage-element at a second rate. The first magnetic-storage element constrains these rates.

The invention also includes circuitry that is described by the foregoing data structure. Such circuitry includes a switching network having first and second switching terminals, and configured for disposition, along with first and second regulating circuits, at least one of which includes a magnetic storage element, on a power-flow path between first and second power converter terminals of a power converter, the first and second power converter terminals of which are maintained at corresponding first and second voltages, the second voltage being lower than the first voltage. The switching network is configured to transition between switch configurations during each of which an amount of charge in a charge-storage element in the power converter changes at a rate that is constrained by the magnetic storage element. The power path includes a first-regulating-circuit terminal associated with the first regulating circuit and connected to the first switching network terminal.

These and other features of the invention will be apparent from the following detailed description and the accompanying figures, in which:

These and other features of the invention will be apparent from the following detailed description and the accompanying figures, in which:

DETAILED DESCRIPTION

Figure 1A:
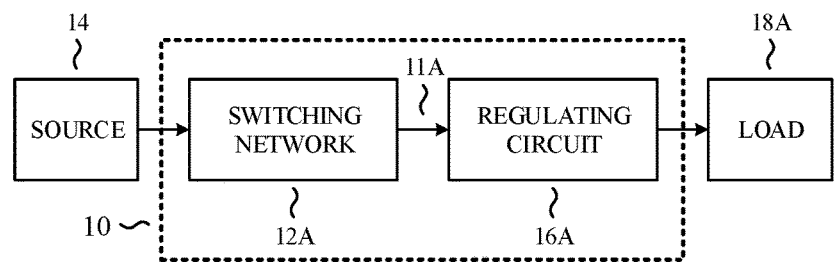
FIG. 1A shows a known DC-DC converter with a separate regulating circuit and switching network.

FIG. 1A shows a converter 10 having a switching network 12A connected to a voltage source 14 at an input end thereof. An input of a regulating circuit 16A is then connected to an output of the switching network 12A. A load 18A is then connected to an output of the regulating circuit 16A. Power flows between the voltage source 14 and the load 18A in the direction indicated by the arrows.

Figure 1B:
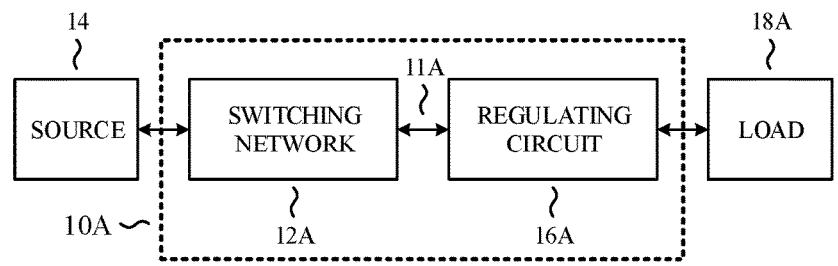
FIG. 1B shows a bidirectional version of FIG. 1A.

Embodiments described herein rely at least in part on the recognition that in a multi-stage DC-DC converter, the various constituent components can be made essentially modular and can be mixed and matched in a variety of different ways. These constituent components include switching networks and regulating circuits, the latter being made to function either as regulators or magnetic filters by simply varying the duty cycle. This modularity simplifies the assembly of such converters. As such, the configuration shown in FIG. 1A represents only one of multiple ways to configure one or more switching networks 12A with one or more regulating circuits 16A. FIG. 1B shows a bidirectional version of FIG. 1A, where power can flow along a power-flow path either from a voltage source 14 to a load 18A or from the load 18A to the voltage source 14, as indicated by the arrows.

There are two fundamental elements described in connection with the following embodiments: switching networks 12A, 12B and regulating circuits 16A, 16B. Assuming series connected elements of the same type are combined, there are a total of four basic building blocks. These are shown in FIGS. 1A-4. The embodiments disclosed herein include at least one of the four basic building blocks shown in FIGS. 1A-4. More complex converter can be realized by combining the fundamental building blocks. In general, a controller, not shown for clarity, will control and coordinate operation of the overall system.

Additional embodiments further contemplate the application of object-oriented programming concepts to the design of DC-DC converters by enabling switching networks 12A, 12B and regulating circuits 16A, 16B to be "instantiated" in a variety of different ways, so long as their inputs and outputs continue to match in a way that facilitates modular assembly of DC-DC converters having various properties.

In many embodiments, the switching network 12A is instantiated as a switched charge-storage network of charge-storage elements, such as capacitors. Among the more useful topologies of this kind of network are: Ladder, Dickson, Series-Parallel, Fibonacci, and Doubler, all of which can be adiabatically charged and configured into multi-phase networks. A switched charge-storage network is also known as a switched capacitor network when the charge-storage elements are capacitors. A particularly useful switched capacitor network is an adiabatically charged version of a full-wave cascade multiplier. However, diabatically charged versions can also be used.

During operation, charge periodically accumulates and is depleted from the charge-storage elements in a switched charge-storage network. As used herein, changing the charge on a capacitor adiabatically means causing an amount of charge stored in that capacitor to change by passing the charge through a non-capacitive element. A positive adiabatic change in charge on the capacitor is considered adiabatic charging while a negative adiabatic change in charge on the capacitor is considered adiabatic discharging. Examples of non-capacitive elements include inductors, magnetic-storage elements, such as magnetic filters, resistors, and combinations thereof.

In some cases, a capacitor can be charged adiabatically for part of the time and diabatically for the rest of the time. Such capacitors are considered to be adiabatically charged. Similarly, in some cases, a capacitor can be discharged adiabatically for part of the time and diabatically for the rest of the time. Such capacitors are considered to be adiabatically discharged.

Diabatic charging includes all charging that is not adiabatic and diabatic discharging includes all discharging that is not adiabatic.

As used herein, an adiabatically charged switching network is a switching network 12A having at least one capacitor that is both adiabatically charged and adiabatically discharged. A diabatically charged switching network is a switching network 12A that is not an adiabatically charged switching network.

The regulating circuit 16A can be instantiated by circuitry that plays a role in somehow constraining the electrical characteristics of the system in some desirable way. For example, such a circuit might constrain the characteristic to be at some value or range of values, or constrain it to change at some rate, or constraint it to change in some direction. A common example would be a regulator that constrains an output voltage or current to be at a particular value, or to be within some range of values. A buck converter, when combined with an appropriate feedback loop, would be an attractive candidate for such a role due to its high efficiency and speed. Such a converter is also advantageous because of its ability to seamlessly transition from constraining an output voltage to be some desired value to constraining a rate of charge transfer within a switching network 12A to be within some desired range, effectively functioning as a magnetic filter, by adjustment of its duty cycle.

Other suitable regulating circuits 16A include boost converters, buck/boost converters, fly-back converters, forward converters, half-bridge converters, full-bridge converters, Cuk converters, resonant converters, and linear regulators. The fly-back converter can be a quasi-resonant fly-back converter, an active-clamp fly-back converter, an interleaved fly-back converter, or a two-switch fly-back converter. Likewise, the forward converter can be a multi-resonant forward converter, an active-clamp forward converter, an interleaved forward converter, or a two-switch forward converter. The half-bridge converter can be an asymmetric half-bridge converter, a multi-resonant half-bridge converter, or a LLC resonant half-bridge.

Figure 2:
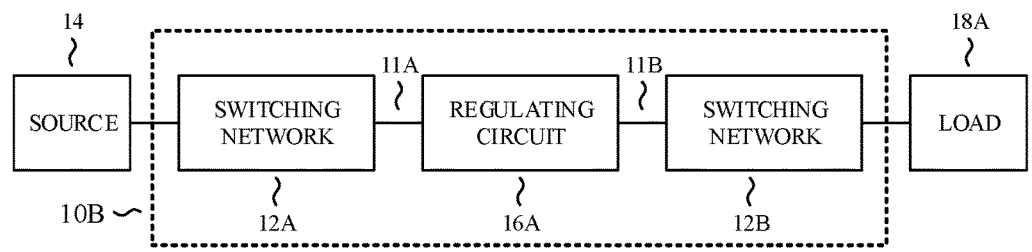
FIGS. 2-4 show DC-DC converters with alternate configurations of regulating circuits and switching networks.

In one embodiment, shown in FIG. 2, a voltage source 14 provides an input to a first switching network 12A, which is instantiated as a switched capacitor network. The output of the first switching network 12A is a lower voltage than the input voltage that is provided to a regulating circuit 16A (e.g. a buck, a boost, or a buck/boost converter). This regulating circuit 16A provides a regulated input voltage to a second switching network 12B, such as another switched capacitor network. A high-voltage output of this second switching network 12B is then applied to a load 18A.

An embodiment such as that shown in FIG. 2 can be configured to regulate the load 18A or to regulate the voltage source 14 depending on the direction of energy flow along the power-flow path.

Figure 3:
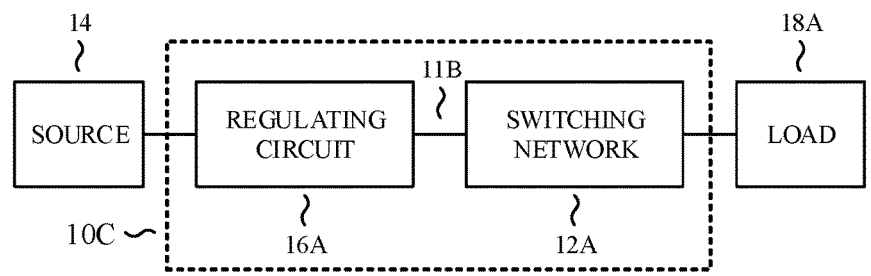

In another embodiment, shown in FIG. 3, a low-voltage source 14 connects to an input of a regulating circuit 16A, the output of which is provided to an input of a switching network 12A to be boosted to a higher DC value. The output of the switching network is then provided to a load 18A.

An embodiment such as that shown in FIG. 3 can be used to regulate the voltage source 14 or the load 18A depending on the direction of energy flow along the power-flow path.

Figure 4:
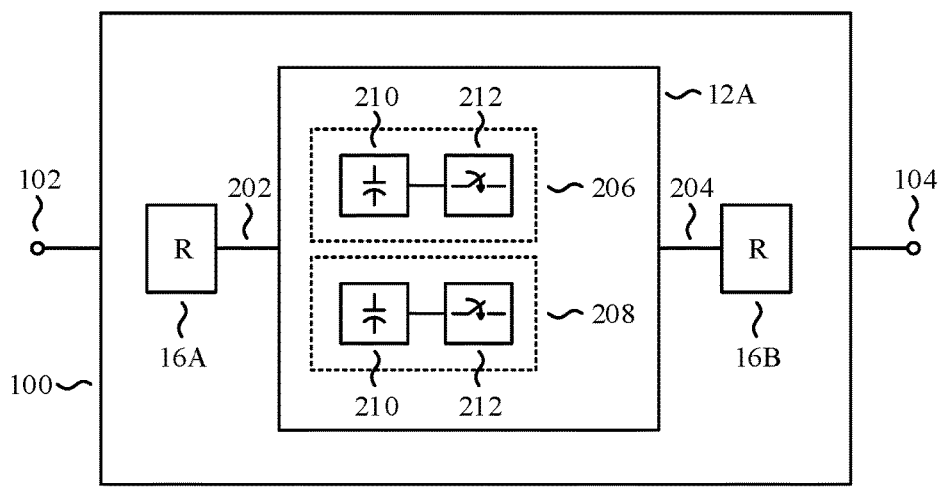

Referring now to FIG. 4, another embodiment of a converter 100 includes a first regulating circuit 16A connected to an input 102 thereof and a second regulating circuit 16B connected to an output 104 thereof. Between the first and second regulating circuits 16A, 16B is a switching network 12A having an input 202 and an output 204. The switching network 12A includes charge-storage elements 210 interconnected by switches 212. These charge-storage elements 210 are divided into first and second groups 206, 208. As discussed above, either one of the regulating circuits 16A, 16B can be a buck converter, which can be either configured to control a voltage or to function as a magnetic filter, a boost converter, a buck/boost converter, a fly-back converter, a Cuk converter, a resonant converter, or a linear regulator. The regulating circuits 16A, 16B can be operated at a duty cycle required to achieve a desired result. For example, in the case of a buck converter, the duty cycle can be adjusted so that the buck converter's main switch maintains an indefinitely extended connection to its magnetic-storage element while its accompanying synchronous rectifier remain open indefinitely. Alternatively, one of the two regulating circuits 16A, 16B can be replaced by a magnetic filter, thus avoiding the need for additional switches. Such a magnetic filter includes a magnetic-storage element, such as an inductor, that resists rapid changes in current and thus promotes adiabatic charging of capacitors in the switching network 12A.

Figure 5:
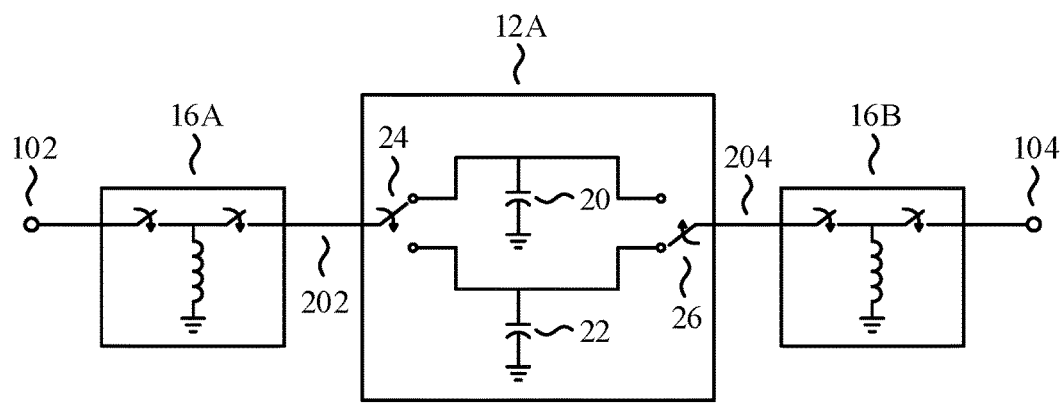
FIG. 5 shows a particular implementation of the power converter illustrated in FIG. 4.

In some embodiments, the switching network 12A can be a bidirectional switched capacitor network such as that shown in FIG. 5. The switched capacitor network in FIG. 5 features a first capacitor 20 and a second capacitor 22 in parallel. A first switch 24 selectively connects one of the first and second capacitors 20, 22 to a first regulating circuit 16A, and a second switch 26 selectively connects one of the first and second capacitors 20, 22 to a second regulating circuit 16B. Like the regulators shown in FIG. 4, the first and second regulating circuits 16A, 16B can be operated at variable duty cycles. Alternatively, one of the regulating circuits 16A, 16B can be replaced by a magnetic filter having an inductor that resists rapid changes in current and thus promotes adiabatic charging of capacitors within the switching network 12A. Both the first and second switches 24, 26 can be operated at high frequency, thus facilitating the adiabatic charging and discharging of the first and second capacitors 20, 22.

The particular embodiment shown in FIG. 5 has a two-phase switching network 12A. However, other types of switching networks 12A can be used instead.

Figure 6A:
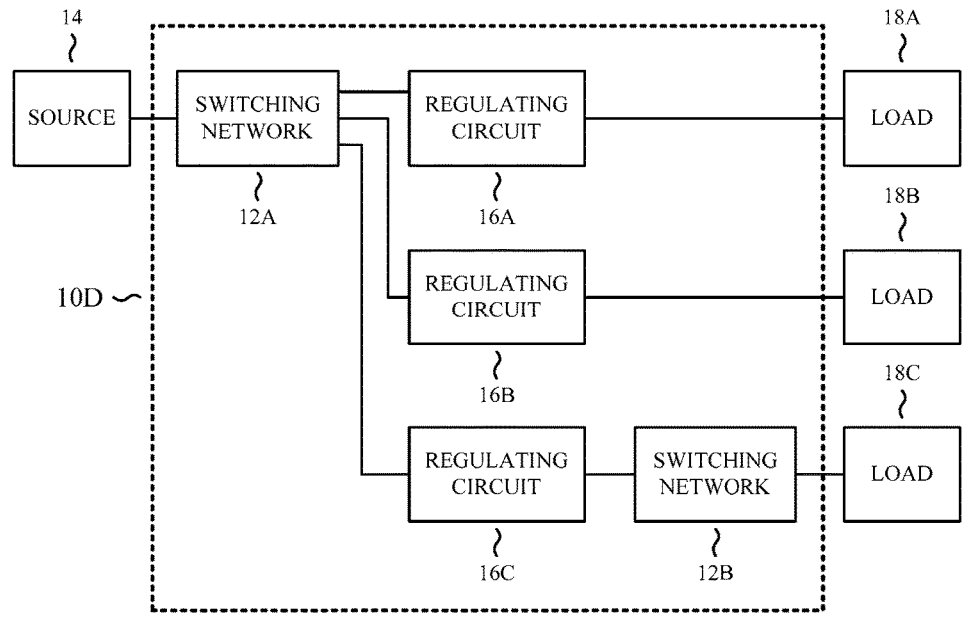
FIGS. 6A and 6B show embodiments with multiple regulating circuits.

In yet another embodiment, shown in FIG. 6A, first, second, and third regulating circuits 16A, 16B, 16C, which could be incorporated into one or more separate power management ICs, are provided at an output of a first switching network 12A for driving first, second, and third loads 18A, 18B, 18C. For the third load 18C, a second switching network 12B is provided between the third load 18C and the third regulating circuit 16C thus creating a pathway similar to that shown in FIG. 2. Thus, FIG. 6A provides an example of how the modular construction of regulating circuits and switching networks facilitates the ability to mix and match components to provide flexibility in DC-DC converter construction.

Figure 6B:
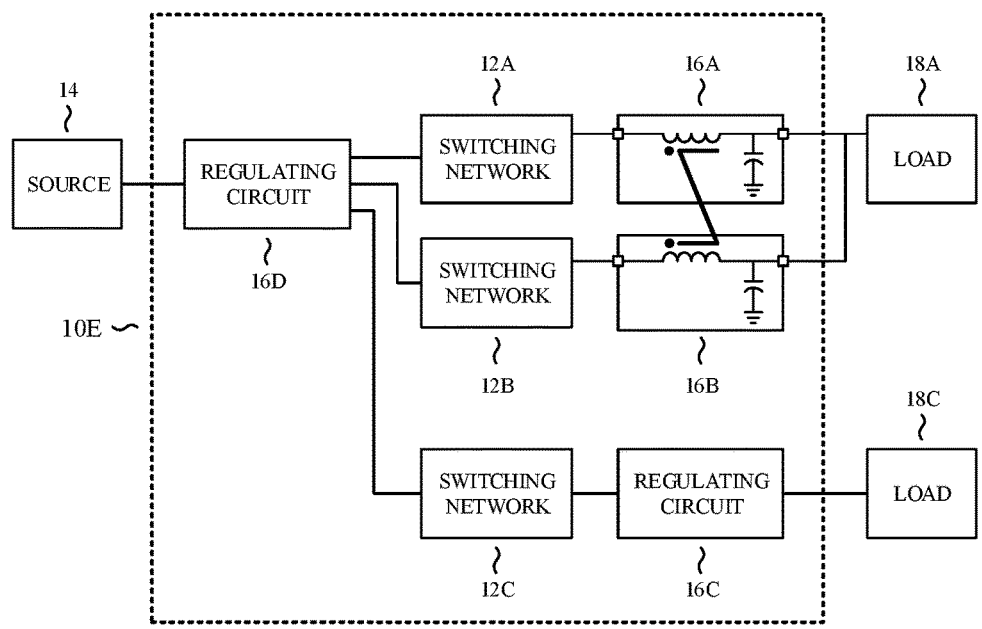

Additional flexibility can be had by coupling components that are in different modules. For example, in FIG. 6B, the configuration shown in FIG. 6A has been reversed: first, second, and third regulating circuits 16A, 16B, 16C in FIG. 6A are replaced with first, second, and third switching networks 12A, 12B, 12C in FIG. 6B; and first and second switching networks 12A, 12B in FIG. 6A are replaced with fourth and third regulating circuits 16D, 16C in FIG. 6B. However, the first and second loads 18A, 18B in FIG. 6A have been consolidated into a first load 18A and into first and second regulating circuits 16A, 16B, in the form of magnetic filters, that have been added to constrain charge transfer within the first and second switching networks 12A, 12B. The first and second regulating circuits 16A, 16B are implemented by buck converters with appropriately selected duty cycles. In FIG. 6B, the first and second regulating circuits 16A, 16B have an inductor that shares the same core, thus coupling them together. This provides a way to save space in the circuit's overall footprint.

A switched capacitor (SC) DC-DC power converter includes a network of switches and capacitors. By cycling the network through different topological states using these switches, one can transfer energy from an input to an output of the SC network. Some converters, known as "charge pumps," can be used to produce high voltages in FLASH and other reprogrammable memories.

Figure 7:
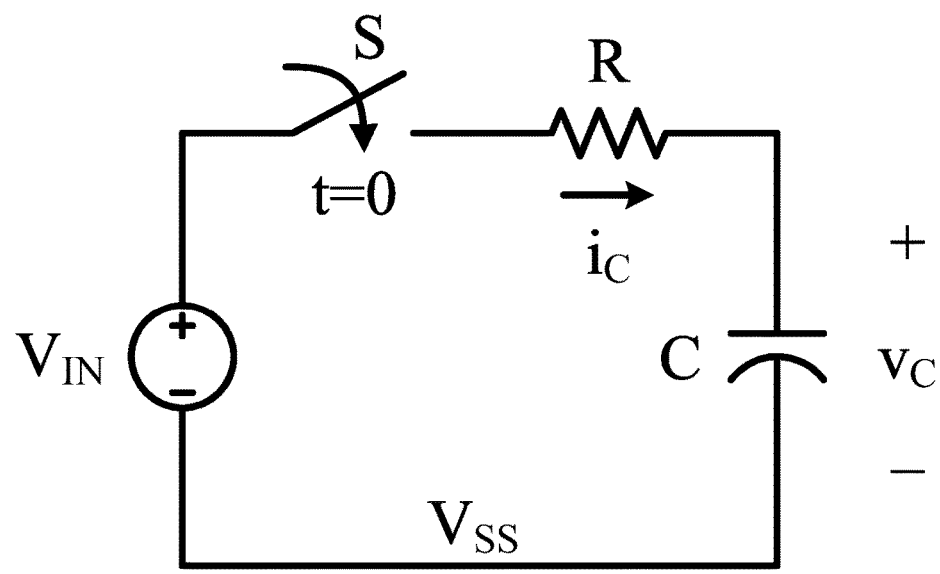
FIG. 7 shows an RC circuit.

FIG. 7 shows a capacitor C initially charged to some value $V_C(0)$. At t=0 the switch S is closed. At that instant, a brief surge of current flows as the capacitor C charges to its final value of $V_{in}$. The rate of charging can be described by a time constant $\tau=RC$, which indicates the time it takes the voltage to either rise or fall to within 1/e of its final value. The exact capacitor voltage $v_c$ (t) and current $i_c$ (t) are given by the following equations:

$$v_c(t) = v_c(0) + [V_{in} - v_c(0)](1 - e^{-t/RC}),\quad (1.1)$$

and $$i_c(t) = C\frac{dv_c}{dt} = \frac{V_{in} - v_c(0)}{R} e^{-t/RC}. \quad (1.2)$$

The energy loss incurred while charging the capacitor can be found by calculating the energy dissipated in resistor R, which is $$E_{loss}(t) = \int_{t=0}^{\infty} i_R(t) \times v_R(t) dt = \int_{t=0}^{\infty} [i_c(t)]^2 R dt. \quad (1.3)$$

The equation can be further simplified by substituting the expression for $i_c$ (t) from equation (1.2) into equation (1.3). Evaluating the integral then yields $$E_{loss}(t) = \frac{1}{2}[V_{in} - v_c(0)]^2 C[1 - e^{-2t/RC}].$$

If the transients are allowed to settle (i.e. t→∞), the total energy loss incurred in charging the capacitor is independent of its resistance R. In that case, the amount of energy loss is equal to $$E_{loss}(\infty) = \frac{1}{2}C\Delta v_c^2.$$

Figure 8:
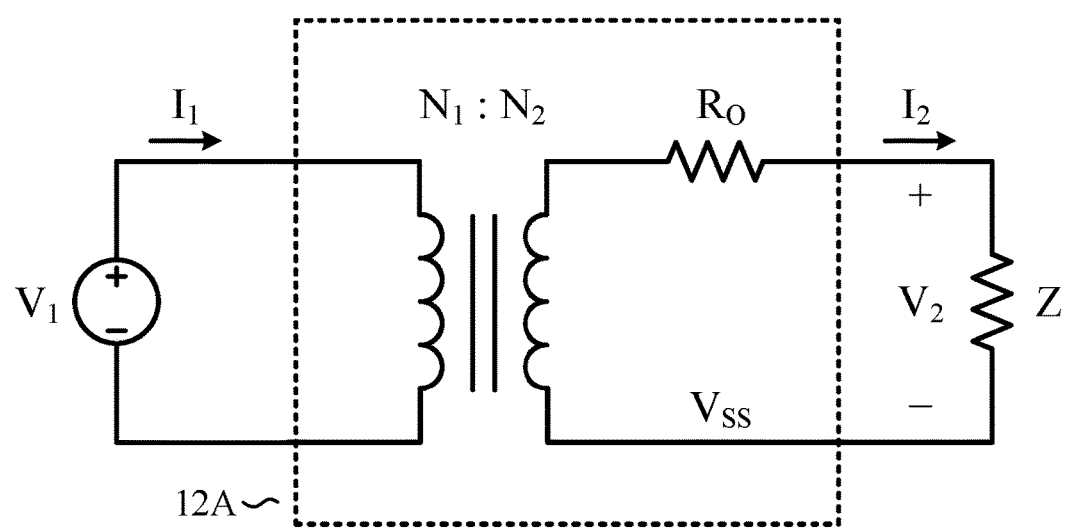
FIG. 8 shows a model of a switched capacitor DC-DC converter.

A switched capacitor converter can be modeled as an ideal transformer, as shown in FIG. 8, with a finite output resistance $R_o$ that accounts for the power loss incurred in charging or discharging of the energy transfer capacitors, as shown in FIG. 8. This loss is typically dissipated in the ON resistance of the MOSFETs and equivalent series resistance of the capacitors.

The output voltage of the switched capacitor converter is given by $$V_o = V_{in}\frac{N_2}{N_1} - I_o R_o.$$

There are two limiting cases where the operation of switched capacitor converters can be simplified and $R_o$ easily found. These are referred to as the "slow-switching limit" and the "fast-switching limit."

In the fast-switching limit ($\tau \gg T_{sw}$), the charging and discharging currents are approximately constant, resulting in a triangular AC ripple on the capacitors. Hence, $R_o$ is sensitive to the series resistance of the MOSFETs and capacitors, but is not a function of the operating frequency. In this case, $R_o$ of the converter operating in the fast-switching limit is a function of parasitic resistance.

In the slow-switching limit, the switching period $T_{sw}$ is much longer than the RC time constant $\tau$ of the energy transfer capacitors. Under this condition, there is systemic energy loss irrespective of the resistance of the capacitors and switches. This systemic energy loss arises in part because the root mean square (RMS) of the charging and discharging current is a function of the RC time constant. If the effective resistance $R_{eff}$ of the charging path is reduced (i.e. reduced RC), the RMS current increases and it so happens that the total charging energy loss ($E_{loss}=I_{RMS}^2 R_{eff}=\frac{1}{2}C\times\Delta V_{C2}$) is independent of $R_{eff}$. One solution to minimize this energy loss is to increase the size of the pump capacitors in the switched capacitor network.

It is desirable for a switched capacitor network to have a common ground, large transformation ratio, low switch stress, low DC capacitor voltage, and low output resistance. Among the more useful topologies are: Ladder, Dickson, Series-Parallel, Fibonacci, and Doubler.

Figure 9A:
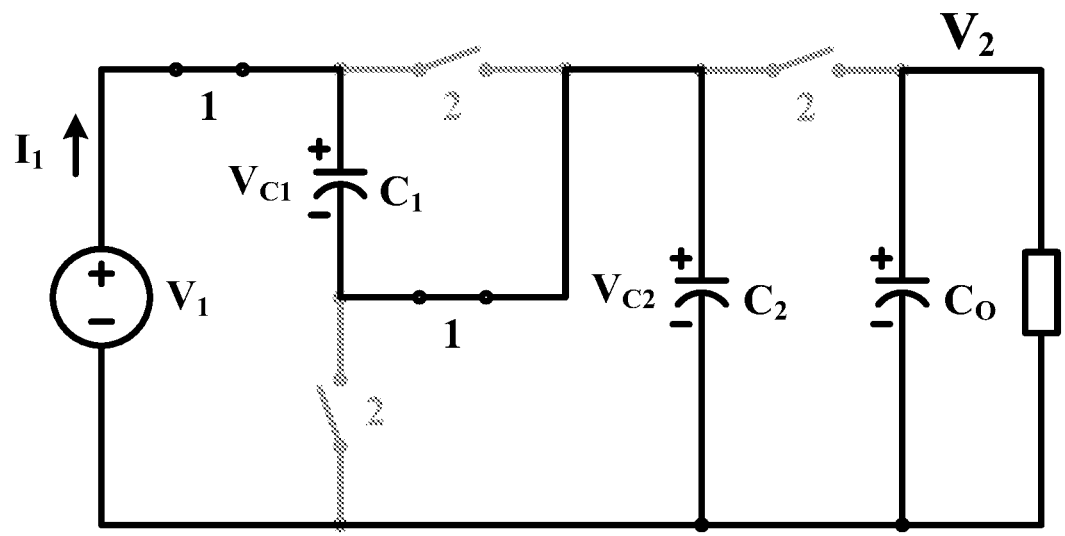
FIGS. 9A and 9B show a series-parallel SC converter operating in charge phase and discharge phase, respectively.
Figure 9B:
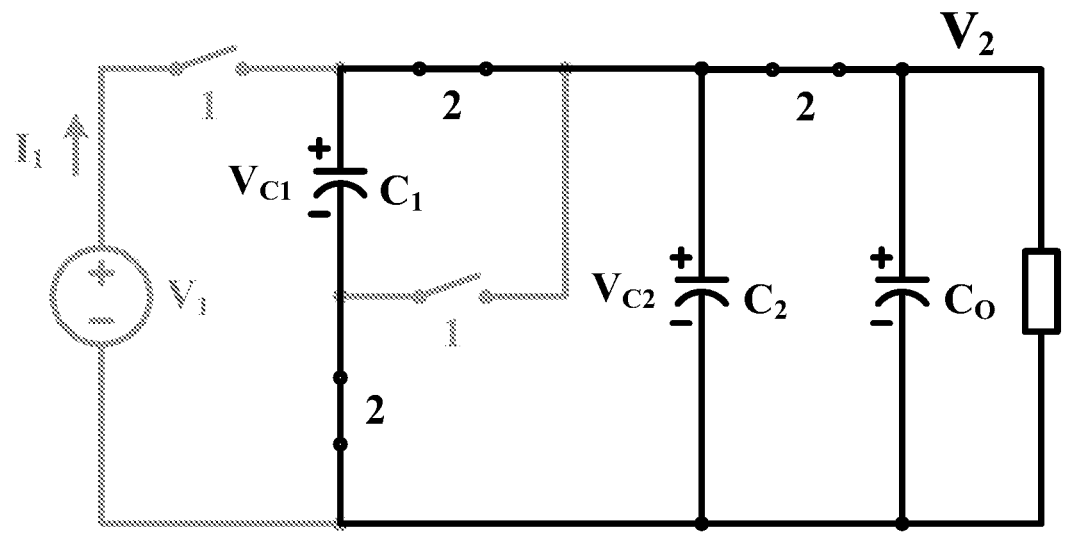

One useful converter is a series-parallel switched capacitor converter. FIGS. 9A and 9B show a 2:1 series-parallel switched capacitor converter operating in charge phase and in discharge phase, respectively. During the charge phase, the capacitors are in series. In the discharge phase, the capacitors are in parallel. In its charge phase, capacitor voltages $v_{C1}$ and $v_{C2}$ add up to $V_1$ while in its discharge phase, $v_{C1}$ and $v_{C2}$ equal $V_2$, which means that $V_2=V_1/2$.

Figure 10:
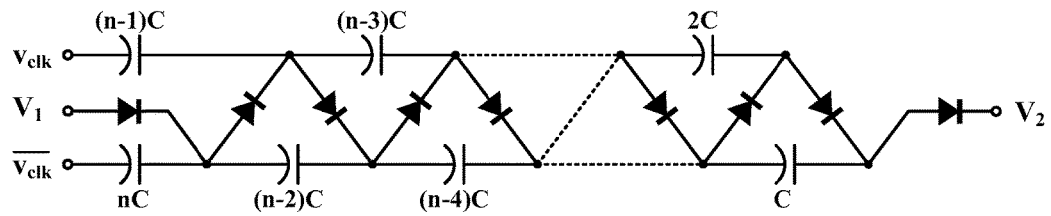
FIG. 10 shows a series pumped symmetric cascade multiplier with diodes.
Figure 11:
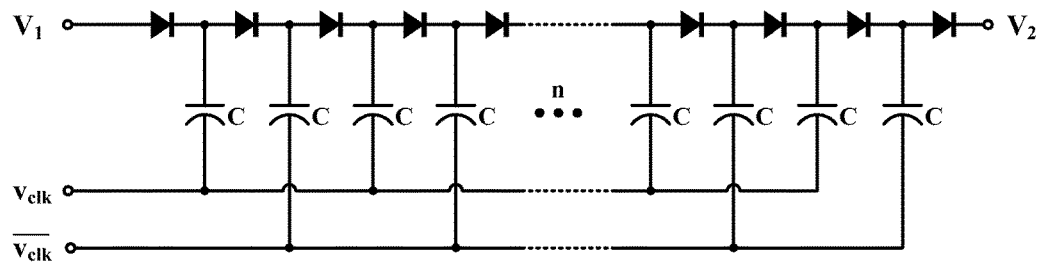
FIG. 11 shows a parallel pumped symmetric cascade multiplier with diodes.
Figure 12:
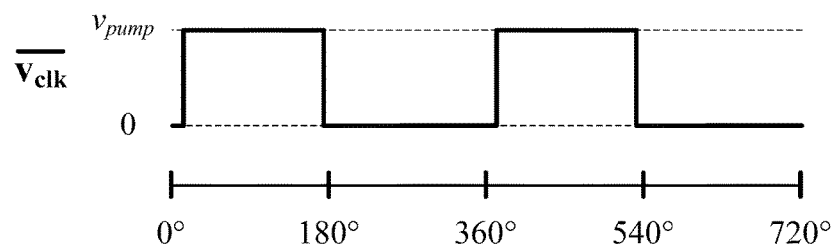
FIG. 12 shows charge pump signals.

Other useful topologies are cascade multiplier topologies, as shown in FIGS. 10 and 11. In both charge pumps, a source is located at $V_1$ and a load is located at $V_2$. In these types of charge pumps, packets of charge are pumped along a diode chain as the coupling capacitors are successively charged and discharged. As shown in FIG. 12, clock signals $v_{clk}$ and $\overline{v_{clk}}$ with amplitude $v_{pump}$ are 180 degrees out of phase. The coupling capacitors can either be pumped in series or in parallel.

It takes n clock cycles for the initial charge to reach the output. The charge on the final pump capacitor is n times larger than the charge on the initial pump capacitor and thus $V_2$ for the converters is $V_1+(n-1) \times v_{pump}$ in both pumping configurations.

Although the foregoing topologies are suitable for stepping up voltage, they can also be used to step down voltage by switching the location of the source and the load. In such cases, the diodes can be replaced with controlled switches such as MOSFETs and BJTs.

Figure 13:
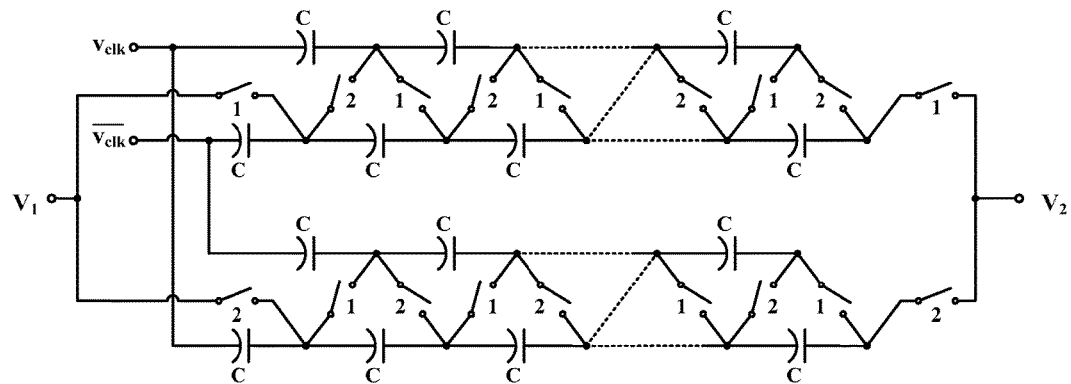
FIG. 13 shows a two-phase symmetric series pumped cascade multiplier with switches.
Figure 14:
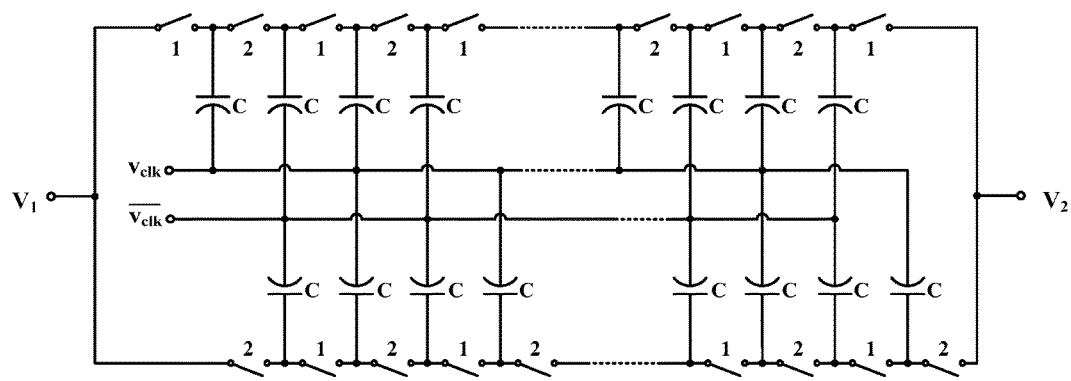
FIG. 14 shows a two-phase symmetric parallel pumped cascade multiplier with switches.
Figure 15:
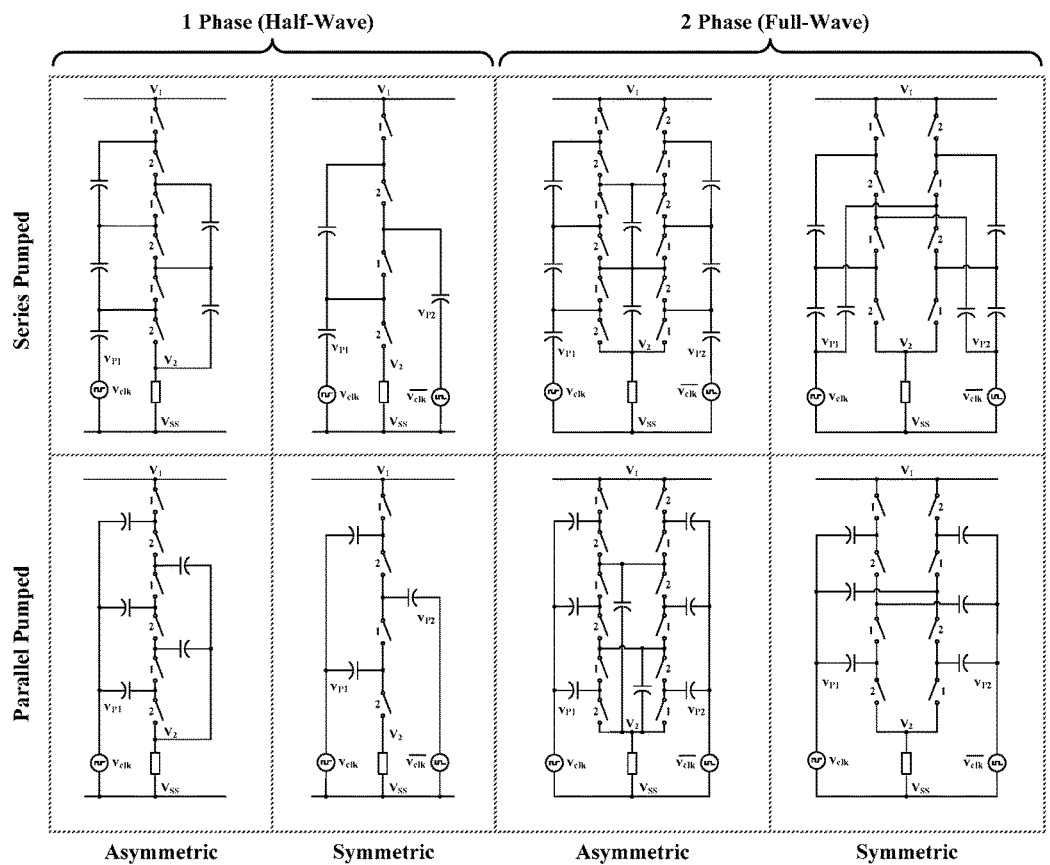
FIG. 15 shows four different cascade multipliers along with corresponding half-wave versions.

The foregoing cascade multipliers are half-wave multipliers in which charge is transferred during one phase of the of the clock signal. This causes a discontinuous input current. Both of these cascade multipliers can be converted into full-wave multipliers by connecting two half-wave multipliers in parallel and running the half-wave multipliers 180 degrees out of phase. FIG. 13 shows a full-wave symmetric series pumped cascade multiplier version while FIG. 14 shows a full-wave symmetric parallel pumped cascade multiplier version. Unlike the diodes in the half-multiplier, the switches in FIG. 13 and FIG. 14 are bidirectional. As a result, in both of these cascade multipliers, power can flow either from the source to the load or from the load to the source. Asymmetric multipliers can also be converted into full-wave multipliers FIG. 15 shows four different step-down versions of full-wave multipliers along with their corresponding half-wave versions. Furthermore, it is possible to combine N phases in parallel and run them 180 degrees/N out of phase to reduce output voltage ripple and increase output power handling capability. The asymmetric multipliers have a special property: they contain DC nodes that are at voltage levels that are multiples of $V_2$. These DC nodes can serve as tap points for delivering or drawing power. They also provide convenient locations at which to reference $V_1$. This permits one to separate the grounds.

The basic building blocks in the modular architecture shown FIGS. 1A-4 can either be connected as independent entities or coupled entities. In the situation where switching networks and regulating circuits are tightly coupled, it is possible to prevent and/or reduce the systemic energy loss mechanism of the switching networks through adiabatic charging. This generally includes using the regulating circuit to control the charging and discharging of the capacitors in the switching network. Furthermore, the output voltage of the regulating circuit and thus the total converter can be regulated in response to external stimuli. One approach to regulating the output voltage is by controlling the average DC current in a magnetic-storage element, such as that found in a magnetic filter.

A desirable feature of the regulating circuit is to constrain the root mean square (RMS) current through the capacitors in the switching network to be below some limit. A regulating circuit achieves such a constraint by using either resistive or magnetic-storage elements. Unfortunately, resistive elements would consume power so their use is less desirable. Therefore, embodiments described herein rely on a magnetic-storage element with optional switches in the regulating circuit. The regulating circuit limits the RMS current by forcing the capacitor current through the magnetic-storage element in the regulating circuit that has an average DC current. In those regulating circuits that include switches, the switches are operated so as to maintain an average DC current through the magnetic-storage element. This can be achieved by varying the duty cycle of a switch in series with the magnetic-storage element. In one embodiment, the duty cycle approaches zero so that at least one switch is effectively always on. In the limiting case, at least one switch can be eliminated altogether.

The regulating circuit may limit both the RMS charging current and the RMS discharging current of at least one capacitor in the switching network. One single regulating circuit may limit the current in or out of the switching network by sinking and/or sourcing current. Therefore, there are four fundamental configurations, which are shown in FIGS. 1A-4. Assuming power flows from the source to load then, in FIG. 1A, the regulating circuit 16A may sink both the charging and discharging current of the switching network 12A. In FIG. 3, the regulating circuit 16A may source both the charging and discharging current of the switching network 12A. In FIG. 4, the regulating circuit 16A may source the charging current of the switching network 12A and the regulating circuit 16B may sink the discharging current of the same switching network 12A and vice-versa. In FIG. 2, the regulating circuit 16A may source both the charging and discharging current of the switching network 12B while also sinking both the charging and discharging current of the switching network 12A. Furthermore, if both the switching networks 12A, 12B and the regulating circuits 16A, 16B allow power to flow in both directions then bidirectional power flow is possible (source to load and load to source).

One embodiment relies on at least partially adiabatically charging full-wave cascade multipliers. A particularly preferred switching network, because of its superior fast-switching limit impedance, the ease with which it can be scaled up in voltage, and its low switch stress, is the cascade multiplier.

In cascade multipliers, the coupling capacitors are typically pumped with a clocked voltage source $v_{clk}$ & $\overline{v_{clk}}$. However, if the coupling capacitors are pumped with a clocked current source $i_{clk}$ & $\overline{i_{clk}}$ instead, then the RMS charging and discharging current in the coupling capacitor may be limited. In this case, the capacitors are at least partially charged adiabatically thus lowering, if not eliminating, the $\frac{1}{2}C \times \Delta Vc^2$ loss that is associated with a switched capacitor converter when operated in the slow-switching limit. This has the effect of lowering the output impedance to the fast-switching limit impedance. As shown by the black dotted line in FIG. 16, which depicts adiabatic operation, under full adiabatic charging, the output impedance would no longer be a function of switching frequency.

With all else being equal, an adiabatically charged switched capacitor converter can operate at a much lower switching frequency than a conventionally charged switched capacitor converter, but at higher efficiency. Conversely, an adiabatically charged switched capacitor converter can operate at the same frequency and with the same efficiency as a conventionally charged switched capacitor converter, but with much smaller coupling capacitors, for example, between four and ten times smaller.

Figure 17:
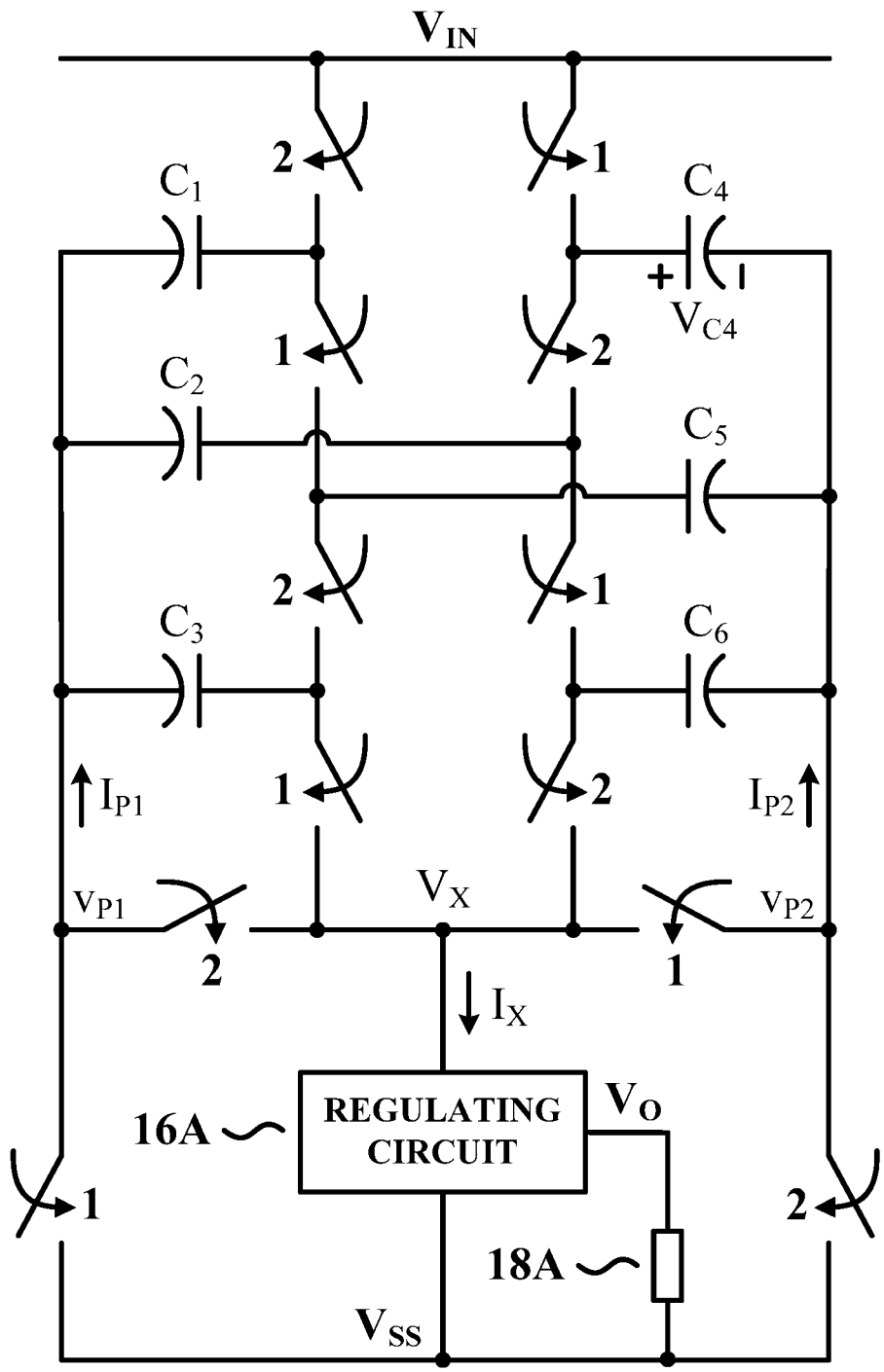
FIG. 17 shows a particular implementation of the DC-DC converter illustrated in FIG. 1B with a full-wave adiabatically charged switching network.

FIG. 17 shows a step-down converter consistent with the architecture shown in FIG. 1B. In this embodiment, the switching network 12A is adiabatically charged using the regulating circuit 16A. The clocked current sources $i_{clk}$ & $\overline{I_{clk}}$ are emulated by four switches and the regulating circuit 16A. The output capacitor $C_O$ has also been removed so as to allow $V_X$ to swing. In this example, the regulating circuit 16A is a boost converter that behaves as constant source with a small AC ripple. Any power converter that has a non-capacitive input impedance at the frequency of operation would have allowed adiabatic operation. Although switch-mode power converters are attractive candidates due to their high efficiency, linear regulators are also practical.

Figure 18:
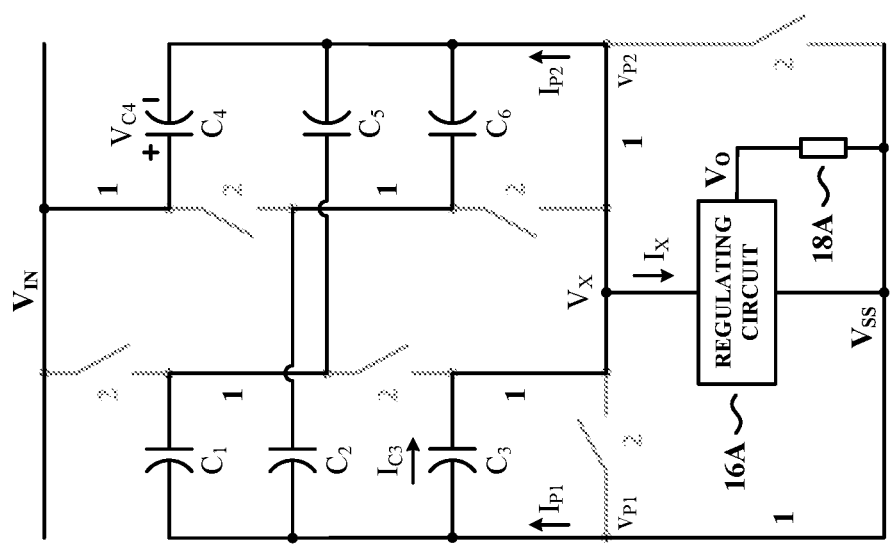
FIG. 18 shows the DC-DC converter illustrated in FIG. 17 during phase A.
Figure 19:
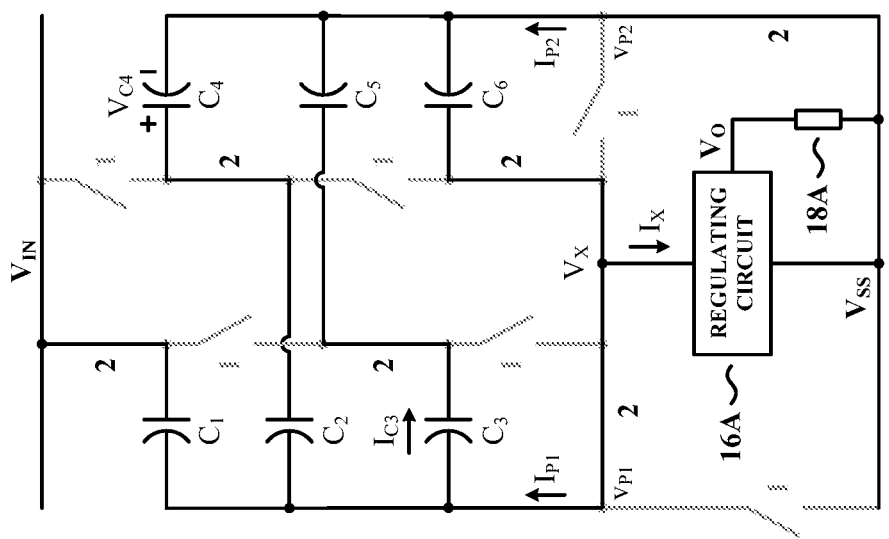
FIG. 19 shows the DC-DC converter illustrated in FIG. 17 during phase B.

In operation, the act of closing switches labeled "1" charges the capacitors $C_4$, $C_5$, and $C_6$ while discharging the capacitors $C_1$, $C_2$, and $C_3$. Similarly, the act of closing switches labeled "2" has the complementary effect. The first topological state (phase A) is shown in FIG. 18, where all switches labeled "1" are closed and all switches labeled "2" are opened. Similarly, the second topological state (phase B) is shown in FIG. 19, where all switches labeled "2" are closed and all switches labeled "1" are opened.

In this embodiment, the regulating circuit 16A limits the RMS charging and discharging current of each capacitor. For example, the capacitor $C_3$ is discharged through the magnetic filtering element in the regulating circuit 16A during phase A, while the capacitor $C_3$ is charged through the magnetic filtering element in the regulating circuit 16A during phase B, clearly demonstrating the adiabatic concept. Furthermore, all of the active components are implemented with switches so the converter can process power in both directions.

Figure 20:
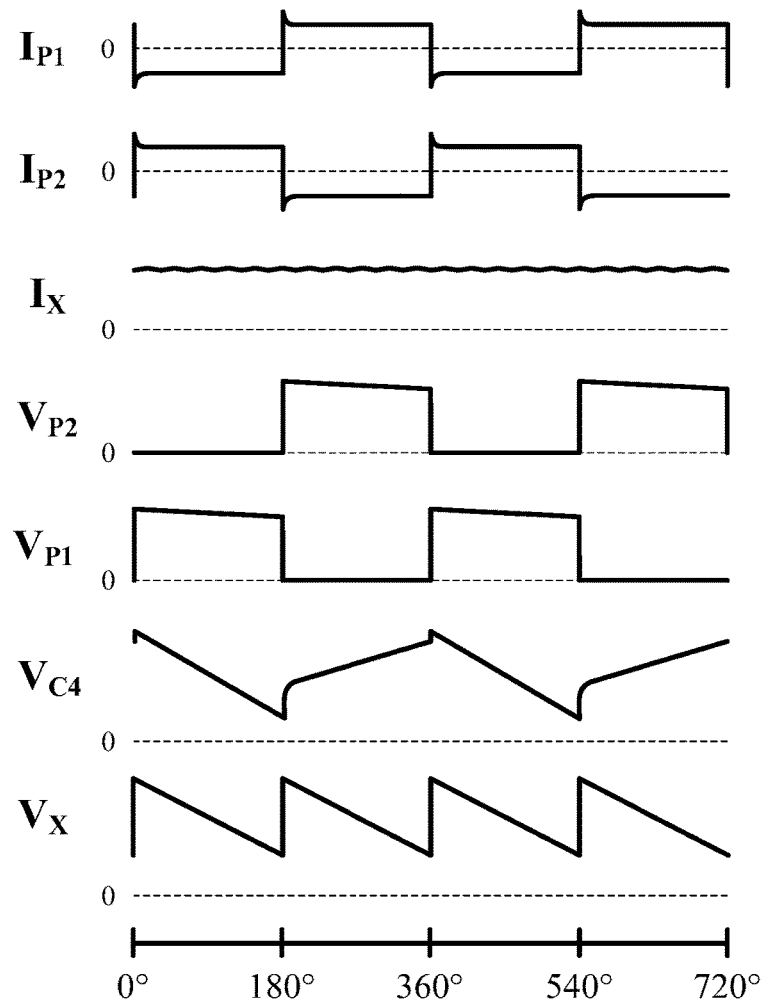
FIG. 20 shows various waveforms associated with a 4:1 adiabatically charged converter.

A few representative node voltages and currents are shown in FIG. 20. There is a slight amount of distortion on the rising and falling edges of the two illustrated currents ($I_{P1}$ and $I_{P2}$), but for the most part, the currents resemble two clocks 180 degrees out of phase. In general, adiabatic charging occurs in cascade multipliers only if at least one end of a switch stack is not loaded with a large capacitance, as is the case in this embodiment, where the $V_X$ node is only loaded down by the regulating circuit 16A.

In operation, different amounts of current will flow through different switches. It is therefore useful to size the switches in a manner appropriate to the currents that will be flowing through them. For example, in FIG. 17, the switches that are connected to the nodes maintained at $V_{P1}$ and $V_{P2}$ carry more current then the other switches. If one were to make all switches the same area, then the remaining switches would be far bigger than necessary. By making the other switches smaller than those connected to the nodes at $V_{P1}$ and $V_{P2}$, one avoids having unnecessarily large switches. Since each switch consumes a portion of the circuit, one can then make the entire circuit physically smaller.

An additional advantage is that capacitive loss increases as the switch area increases. Thus, customizing the switch's area to the current that it carries during operation yields a dual benefit. It not only reduces the overall size of the circuit's footprint, it also has the effect of reducing capacitive loss.

Figure 16:
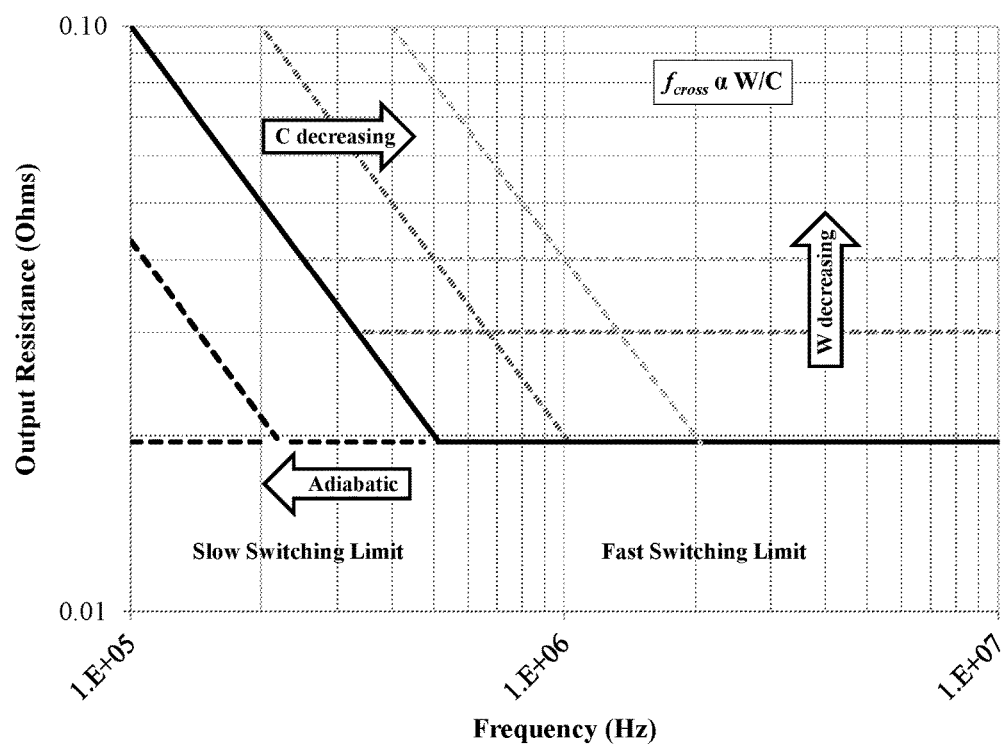
FIG. 16 shows output impedance of a switched capacitor converter as a function of frequency.

The switches shown in FIG. 17 will transition between states at some switching frequency. To reduce loss, it is desirable that the switching network 12A constrain the RMS current through the switches at that switching frequency. One way to constrain the RMS current is to correctly choose the resistances of the switches. In particular, the resistances should be high enough so that the RC time constant of the charge transfer between the capacitors is similar to, or longer than, the switching frequency. As can be seen in FIG. 16, by controlling the width "W" of the switches and hence their resistance and their size, the switching network 12A can be forced into the fast-switching limit region.

Unfortunately, by using the resistance of the switches to constrain the RMS current, resistive power losses increase and the overall efficiency decreases. The regulating circuit 16A, however, allows us to reduce the resistance of the switches while still operating adiabatically. Therefore, the switches can be optimally sized for the highest efficiency without worrying about constraining the RMS current since it is handled by the regulating circuit 16A (or optionally a magnetic filter). The optimal size for each switch is chosen by balancing the resistive and capacitive losses in each switch at a given switching frequency and at a given current.

The modular architecture with the basic building blocks shown in FIGS. 1A-4 may be expanded to cover a wider range of applications, such as high-voltage DC, AC-DC, buck-boost, and multiple output voltages. Each of these applications includes separating the transformation, regulation, and possibly magnetic filtering functions. Extension of the architecture can also incorporate adiabatically charged switched capacitor converters.

Figure 21:
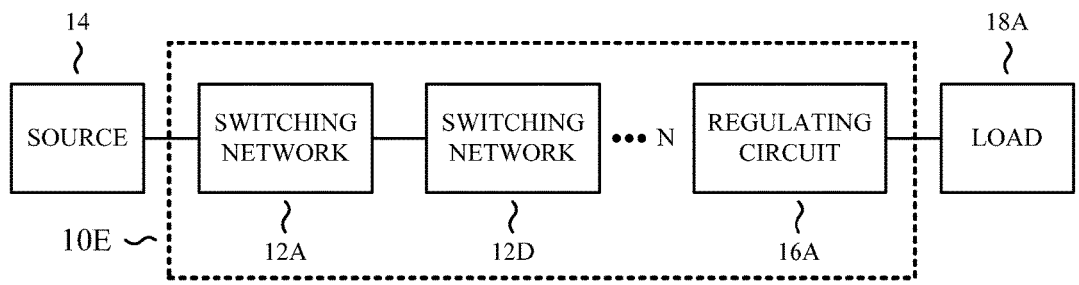
FIG. 21 shows adiabatic charging of series connected stages.

In many switched capacitor converters, the number of capacitors and switches increases linearly with the transformation ratio. Thus, a large number of capacitors and switches are required if the transformation ratio is large. Alternatively, a large transformation ratio can be achieved by connecting numerous low gain stages in series as depicted in FIG. 21. The transformation ratio of the total switch capacitor stack ($V_{in}/V_x$) is as follows:

$$\frac{V_{in}}{V_x} = N_1 \times N_2 \ldots N_n. \tag{2.1}$$

The main disadvantage of the series stacked configuration is that the voltage stresses on the front stages are much higher than those of the rear stages. This will normally require stages with different voltage ratings and sizes. However, the transformation ratio can be easily changed by bypassing one or more stages.

Adiabatic charging of a preceding series-connected switching network only occurs if the following switching network controls the charging and discharging current of the preceding stage. Thus, it is preferable to use full-wave switched capacitor converters in the front stages or to use switched capacitor stages such as the single-phase series-parallel switched capacitor converters with magnetic filters.

Figure 22:
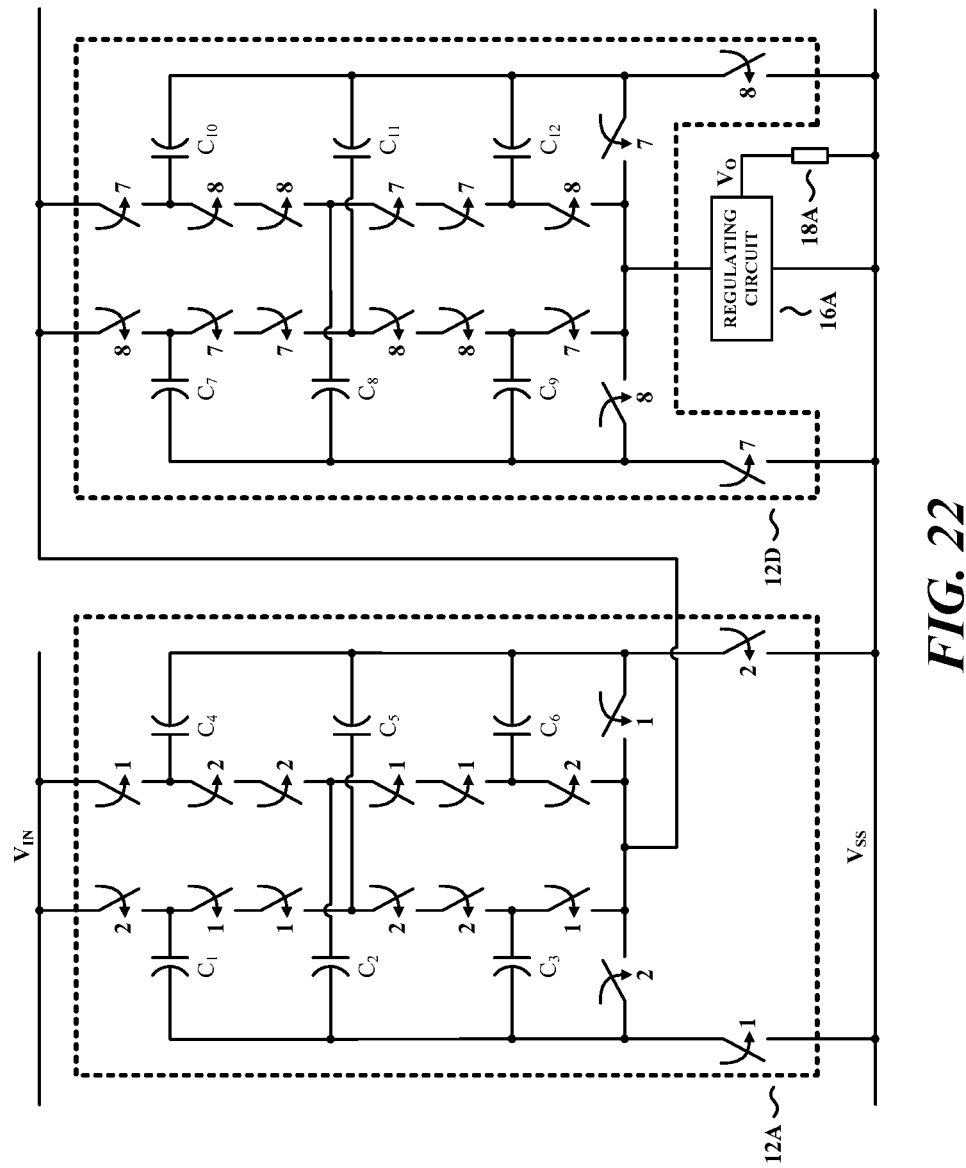
FIG. 22 shows a particular implementation of the power converter illustrated in FIG. 21.

FIG. 22 shows a converter with a first switching network 12A connected in series with a second switching network 12D consistent with the architecture shown in FIG. 21. Both the first and second switching networks 12A, 12D are two-phase cascade multipliers. In operation, switches labeled "1" and "2" are always in complementary states and switches labeled "7" and "8" are always in complementary states. Thus, in a first switched-state, all switches labeled "1" are open and all switches labeled "2" are closed. In a second switched-state, all switches labeled "1" are closed and all switches labeled "2" are opened. In this embodiment, closing switches 1 charges capacitors $C_1$, $C_2$, $C_3$, while discharging capacitors $C_4$, $C_5$, $C_6$ and closing switches 2 has the complementary effect. Also, closing switches 7 charges capacitors $C_7$, $C_8$, $C_9$, while discharging capacitors $C_{10}$, $C_{11}$, $C_{12}$ and closing switches 8 has the complementary effect.

The power converter provides a total step-down of 32:1, assuming the first regulating circuit 16A is a buck converter with a nominal step-down ratio of 2:1. Furthermore, if the input voltage is 32 V and the output voltage is 1 V, then the switches in the first switching network 12A will need to block 8 volts while the switches in the second switching network 12D will need to block 2 volts.

The modular architecture with the basic building blocks shown in FIGS. 1A-4 may be configured to handle an AC input voltage as well. One of the main attributes of switched capacitor converters is their ability to operate efficiency over a large input range by reconfiguring the switched capacitor network. If the AC wall voltage (i.e. 60 Hz & 120 $V_{RMS}$) can be thought of as a slow moving DC voltage, then a front-end switched capacitor stage 13A, also known as an AC switching network, should be able to unfold the time-varying input voltage into a relatively stable DC voltage.

Figure 23:
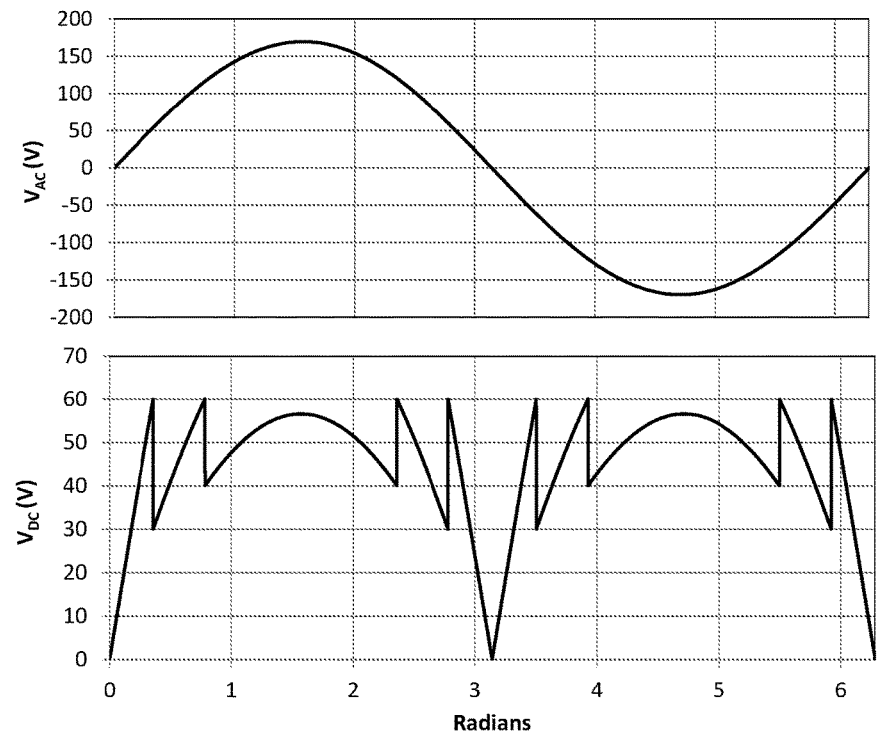
FIG. 23 shows an AC voltage rectified using a reconfigurable switched capacitor stage.

A diagram of a 120 $V_{RMS}$ AC waveform over a single 60 Hz cycle overlaid with the unfolded DC voltage is shown in FIG. 23. The AC switching network 13A has different configurations (1/3, 1/2, 1/1) at its disposal along with an inverting stage. It was also designed to keep the DC voltage under 60 V. Once the AC voltage is unfolded, it is the job of a regulating circuit 16A, shown in FIG. 24, to produce a final output voltage. It may also be necessary to place another switching network between the AC switching network 13A and the regulating circuit 16A to further condition the voltage. If this is the case, then the caveats for series-connected stages hold true since the AC switching network 13A is a special purpose switching network. Some form of magnetic or electric isolation is also common in AC-DC converters for safety reasons. Hence, in FIG. 24, voltages: $V_{AC}$, $V_{DC}$, and $V_O$ are purposely defined as being agnostic to a common ground.

Figure 24:
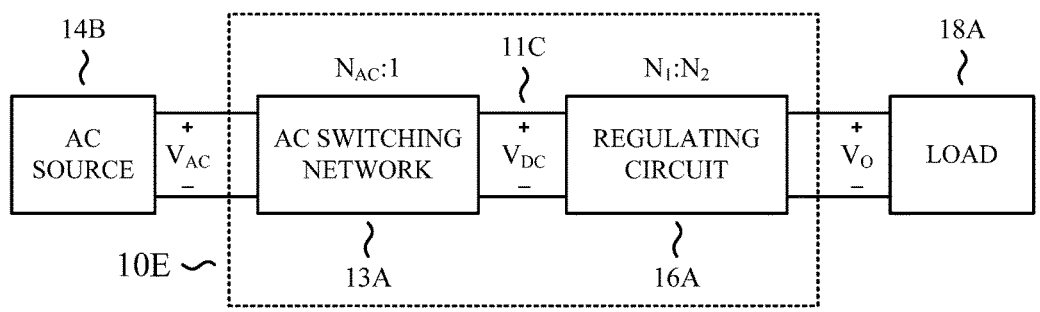
FIG. 24 shows an AC-DC power converter architecture.
Figure 25:
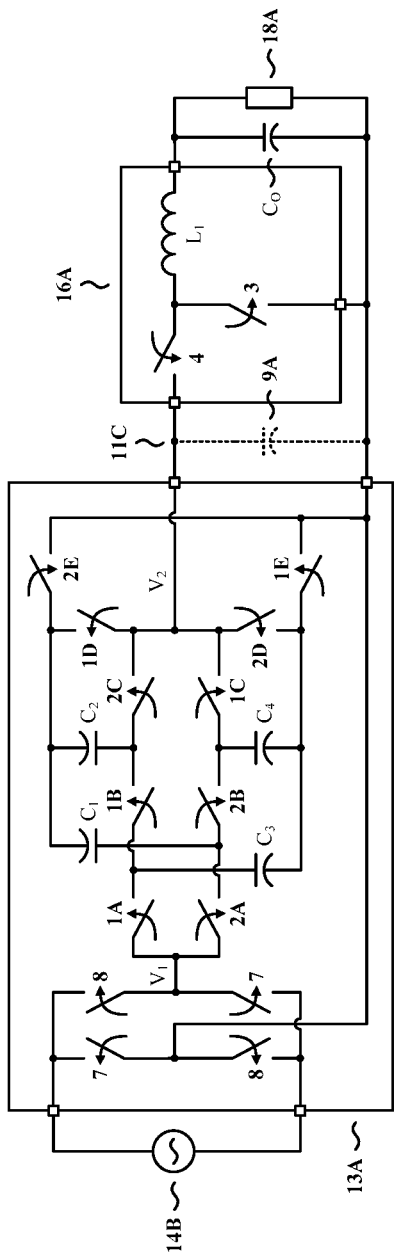
FIG. 25 shows a particular implementation of the AC-DC converter illustrated in FIG. 24.
Figure 26:
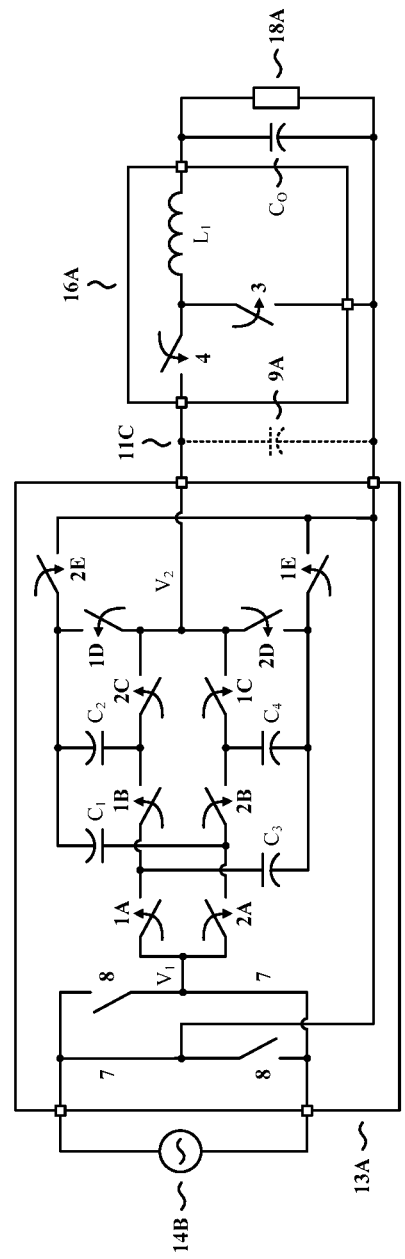
FIG. 26 shows the AC-DC converter illustrated in FIG. 25 during the positive portion of the AC cycle.
Figure 27:
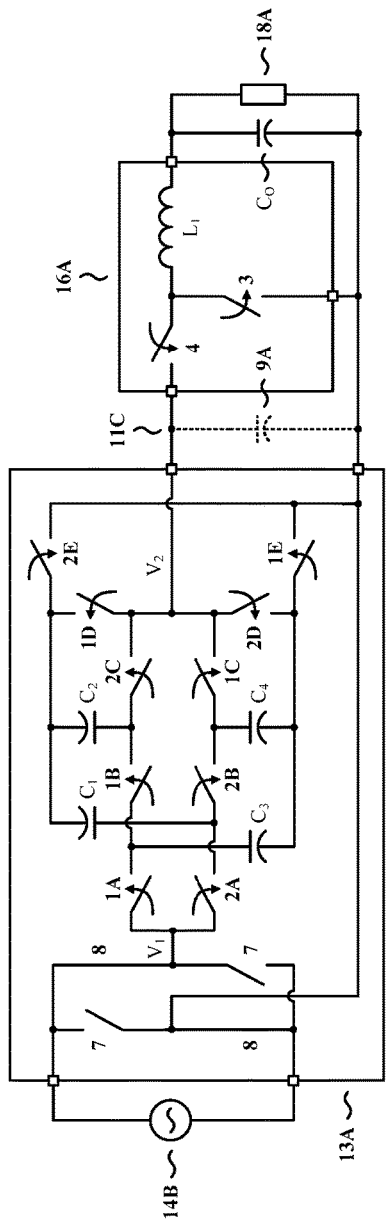
FIG. 27 shows the AC-DC converter illustrated in FIG. 25 during the negative portion of the AC cycle.

FIG. 25 shows an AC-DC converter corresponding to the architecture shown in FIG. 24. In this embodiment, the AC switching network 13A is a synchronous AC bridge rectifier followed by a reconfigurable two-phase step-down cascade multiplier with three distinct conversion ratios (1/3, 1/2, 1/1) while the regulating circuit 16A is a synchronous buck converter. In operation, switches labeled "7" and "8" are always in complementary states. During the positive portion of the AC cycle (0 to π radians) all switches labeled "7" are closed while all switches labeled "8" are opened as shown in FIG. 26. Similarly, during the negative portion of the AC cycle (π to 2π radians) all switches labeled "8" are closed while all switches labeled "7" are opened as shown in FIG. 27.

In addition to the inverting function provided by switches 7 and 8, switches 1A-1E and switches 2A-2E may be selectively opened and closed as shown in Table 1 to provide three distinct conversion ratios of: 1/3, 1/2, and 1.

The AC switching network 13A is provided with a digital clock signal CLK. A second signal CLKB is also generated, which may simply be the complement of CLK (i.e., is high when CLK is low and low when CLK is high), or which may be generated as a non-overlapping complement. With a switching pattern set in accordance with the first row of Table 1, the AC switching network 13A provides a step-down ratio of one-third (1/3). With a switching pattern set in accordance with the second row of Table 1, the AC switching network 13A provides a step-down ratio of one-half (1/2). With a switching pattern set in accordance with the first row of Table 1, the AC switching network 13A provides a step-down ratio of one.

Figure 28:
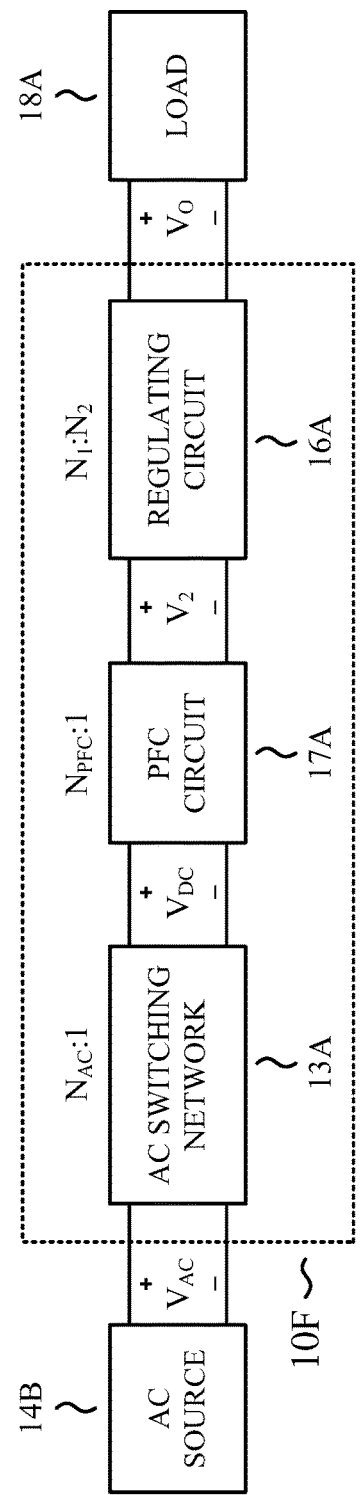
FIG. 28 shows an AC-DC power converter architecture with power-factor correction.

Most power supplies attached to the wall meet some power factor specification. Power factor is a dimensionless number between 0 and 1 that defines a ratio of the real power flowing to apparent power. A common way to control the harmonic current and thus boost the power factor is by using an active power factor corrector, as shown in FIG. 28. A power-factor correction circuit 17A causes the input current to be in phase with the line voltage, thus causing reactive power consumption to be zero.

FIGS. 29-36 show specific implementations of power converters that conform to the architectural diagrams shown in FIGS. 1A-4. In each implementation, a regulating circuit or multiple regulating circuits, which may include magnetic filters, may limit both the RMS charging current and the RMS discharging current of at least one capacitor in each switching network so all of these switching networks are adiabatically charged switching networks. However, if decoupling capacitors 9A or 9B are present, then the ability of the regulating circuit to limit the RMS charging and discharging current may be diminished. Capacitors 9A and 9B are optional and to keep the output voltage fairly constant, a capacitor $C_O$ is used. All of the stages share a common ground. However, this need not be the case. For example, if a regulating circuit 16A is implemented as a fly-back converter, then the ground can be separated easily. Even a switching network 12A can have separate grounds through capacitive isolation. Furthermore, for simplicity, the switching network in each implementation has a single conversion ratio. However, reconfigurable switching networks that provide power conversion at multiple distinct conversion ratios may be used instead.

In operation, switches labeled "1" and "2" are always in complementary states. Thus, in a first switched-state, all switches labeled "1" are open and all switches labeled "2" are closed. In a second switched-state, all switches labeled "1" are closed and all switches labeled "2" are opened. Similarly, switches labeled "3" and "4" are in complementary states, switches labeled "5" and "6" are in complementary states, and switches labeled "7" and "8" are in complementary states. Typically, the regulating circuits operate at higher switching frequencies than the switching networks. However, there is no requirement on the switching frequencies between and amongst the switching networks and regulating circuits.

Figure 29:
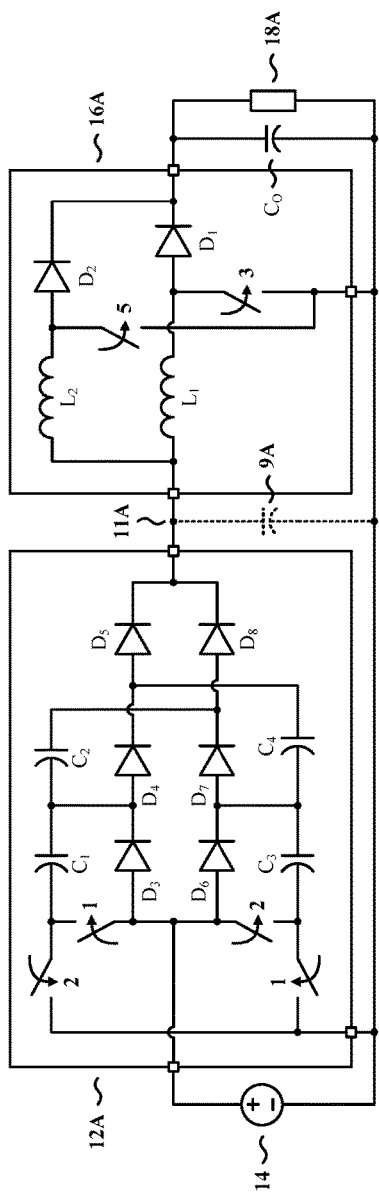
FIGS. 29 and 30 show particular implementations of the DC-DC converter illustrated in FIGS. 1A-1B.

FIG. 29 shows a step-up converter corresponding to the architecture shown in FIG. 1A. In this embodiment, the switching network 12A is a two-phase step-up cascade multiplier with a conversion ratio of 1:3 while the regulating circuit 16A is a two-phase boost converter. In operation, closing switches 1 and opening switches 2 charges capaci-

TABLE 1

| $V_2/V_1$ | 1A | 1B | 1C | 1D | 1E | 2A | 2B | 2C | 2D | 2E |
|---|---|---|---|---|---|---|---|---|---|---|
| 1/3 | CLK | CLK | CLK | CLK | CLK | CLKB | CLKB | CLKB | CLKB | CLKB |
| 1/2 | CLKB | CLK | CLK | CLK | CLK | CLK | CLKB | CLKB | CLKB | CLKB |
| 1/1 | ON | ON | ON | OFF | OFF | ON | ON | ON | OFF | OFF | tors $C_3$ and $C_4$ while discharging capacitors $C_1$ and $C_2$. Conversely, opening switches 1 and closing switches 2 charges the capacitors $C_1$ and $C_2$ while discharging the capacitors $C_3$ and $C_4$.

Figure 30:
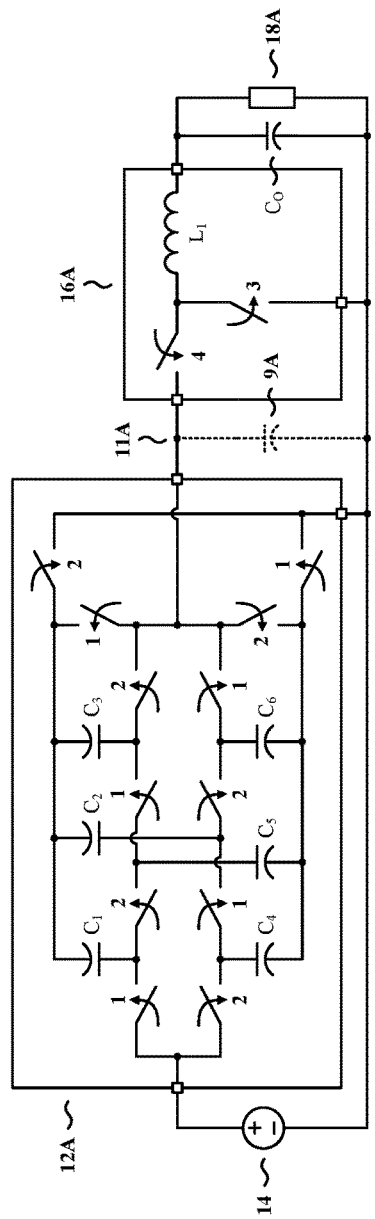

FIG. 30 shows a bidirectional step-down converter corresponding to the architecture shown in FIG. 1B. In this embodiment, the switching network 12A is a two-phase step-down cascade multiplier with a conversion ratio of 4:1 while the regulating circuit 16A is a synchronous buck converter. In operation, closing switches 1 and opening switches 2 charges capacitors $C_1$, $C_2$, and $C_3$ while discharging capacitors $C_4$, $C_5$, and $C_6$. Conversely, opening switches 1 and closing switches 2 charges the capacitors $C_4$, $C_5$, and $C_6$ while discharging the capacitors $C_1$, $C_2$, and $C_3$. All of the active components are implemented with switches so the converter can process power in both directions.

Figure 31:
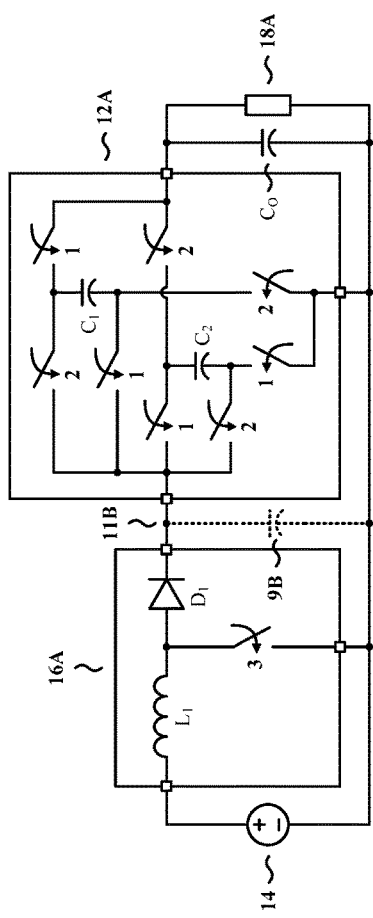
FIGS. 31 and 32 show particular implementations of the DC-DC converter illustrated in FIG. 3.

FIG. 31 shows a step-up converter consistent with the architecture shown in FIG. 3. In this embodiment, the regulating circuit 16A is a boost converter while the switching network 12A is a two-phase step-up series-parallel SC converter with a conversion ratio of 1:2. In operation, closing switches 1 charges a capacitor $C_2$ while discharging a capacitor $C_1$. Closing switches 2 has the complementary effect.

Figure 32:
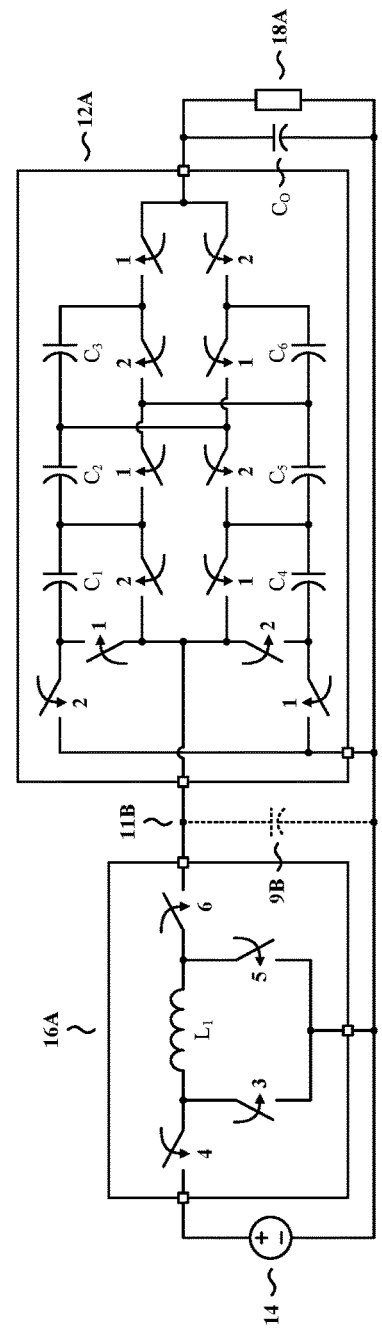

FIG. 32 shows a bidirectional up-down converter consistent with the architecture shown in FIG. 3. In this embodiment, the regulating circuit 16A is a synchronous four switch buck-boost converter while the switching network 12A is a two-phase step-up cascade multiplier with a conversion ratio of 1:4. In operation, closing switches 1 charges capacitors $C_4$, $C_5$, and $C_6$ while discharging capacitors $C_1$, $C_2$, and $C_3$. Closing switches 2 has the complementary effect. All of the active components are implemented with switches so the converter can process power in both directions.

Figure 33:
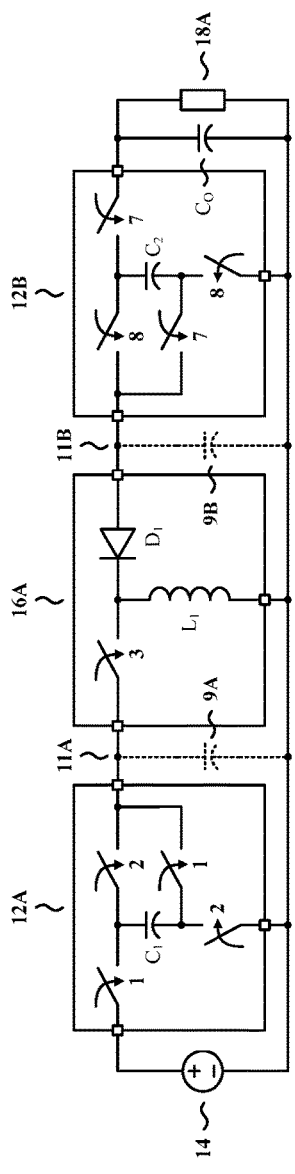
FIGS. 33 and 34 show particular implementations of the DC-DC converter illustrated in FIG. 2.

FIG. 33 shows an inverting up-down converter consistent with the architecture shown in FIG. 2. In this embodiment, the first switching network 12A is a step-down series-parallel SC converter with a conversion ratio of 2:1; the first regulating circuit 16A is a buck/boost converter; and the second switching network 12B is a step-up series-parallel SC converter with a conversion ratio of 1:2. In operation, closing switches 1 charges a capacitor $C_1$ while closing switches 2 discharges the capacitor $C_1$. Similarly, closing switches 7 discharges a capacitor $C_2$ while closing switches 8 charges the capacitor $C_2$.

Figure 34:
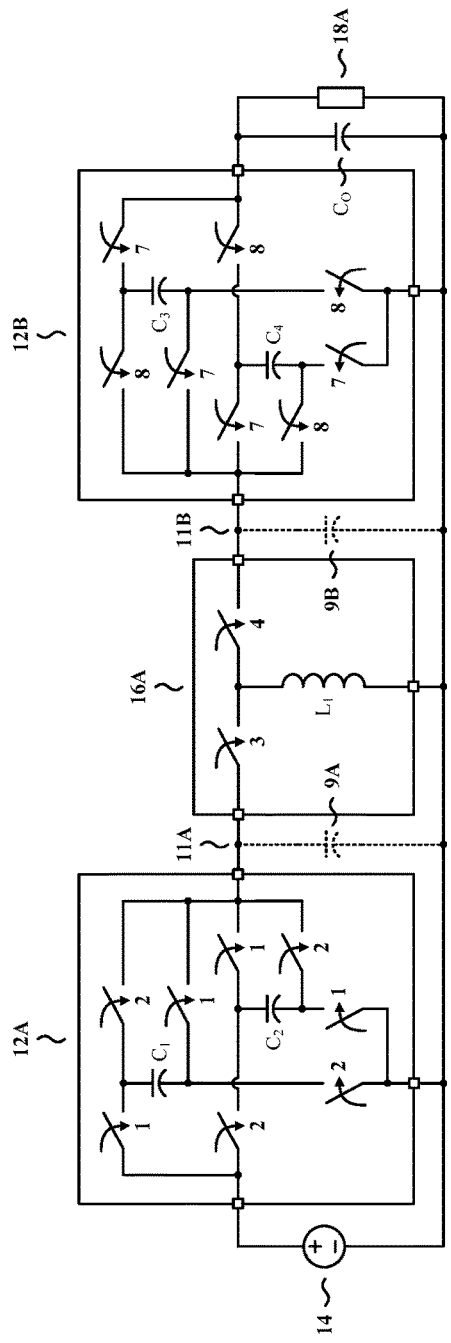

FIG. 34 shows a bidirectional inverting up-down converter consistent with the architecture shown in FIG. 2. In this embodiment, the first switching network 12A is a two-phase step-down series-parallel SC converter with a conversion ratio of 2:1; the first regulating circuit 16A is a synchronous buck/boost converter; and the second switching network 12B is a two-phase step-up series-parallel SC converter with a conversion ratio of 1:2. In operation, closing switches 1 charges a capacitor $C_1$ while discharging a capacitor $C_2$. Closing switches 2 has the complementary effect. Similarly, closing switches 7 charges a capacitor $C_4$ while discharging a capacitor $C_3$. Closing switches 8 has the complementary effect. All of the active components are implemented with switches so the converter can process power in both directions.

Figure 35:
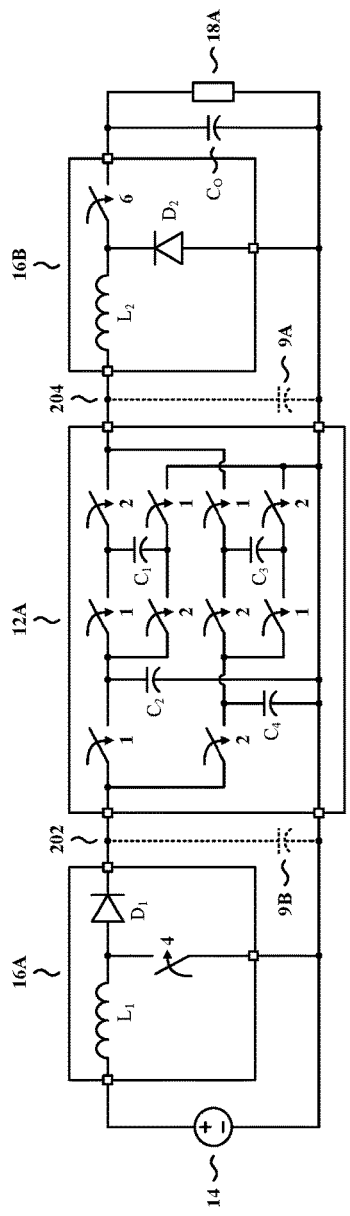
FIGS. 35 and 36 show particular implementations of the DC-DC converter illustrated in FIG. 4.

FIG. 35 shows an up-down converter consistent with the block diagram shown in FIG. 4. In this embodiment, the first regulating circuit 16A is a boost converter; the first switching network 12A is a two-phase step-up series-parallel SC converter with a conversion ratio of 1:2; and the second regulating circuit 16B is a boost converter. In operation, closing switches 1 charges capacitors $C_1$ and $C_2$ while simultaneously discharging capacitors $C_3$ and $C_4$. Closing switches 2 has the complementary effect.

Figure 36:
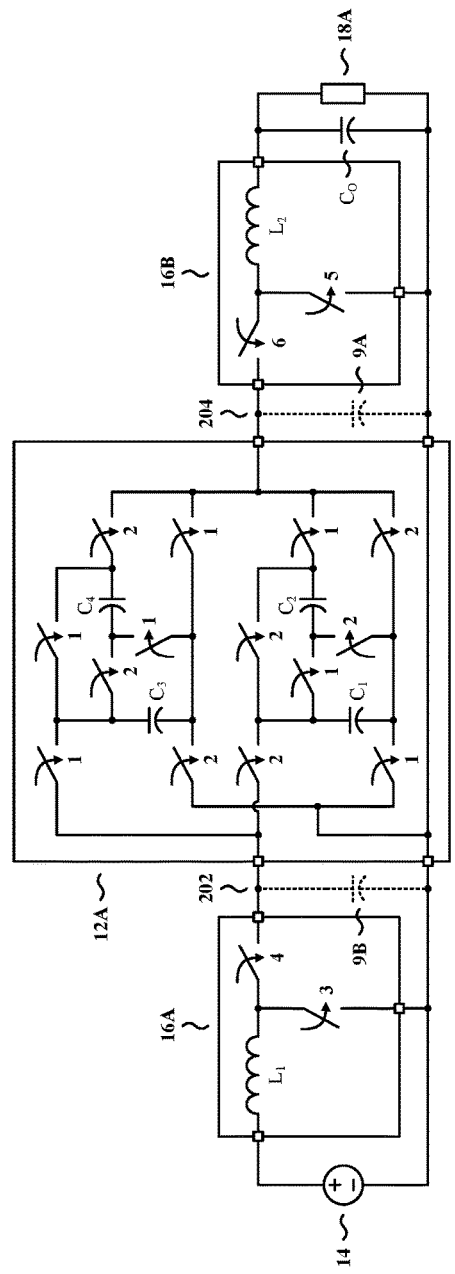

FIG. 36 shows a bidirectional up-down converter consistent with the block diagram shown in FIG. 4. In this embodiment, the first regulating circuit 16A is a synchronous boost converter; the first switching network 12A is a two-phase fractional step-down series-parallel SC converter with a conversion ratio of 3:2; and the second regulating circuit 16B is a synchronous buck converter. In operation, closing switches 1 charges capacitors $C_3$ and $C_4$ while simultaneously discharging capacitors $C_1$ and $C_2$. Closing switches 2 has the complementary effect. All of the active components are implemented with switches so the converter can process power in both directions. Adjusting the duty cycle of the second regulating circuit 16B so that switch 6 remains closed for extended periods allows an inductor $L_2$ to promote adiabatic charge transfer between capacitors in the first switching network 12A. In such an embodiment, the switches 5, 6 can be dispensed with, thus reducing the overall chip area required to implement the second regulating circuit 16B.

Figure 37:
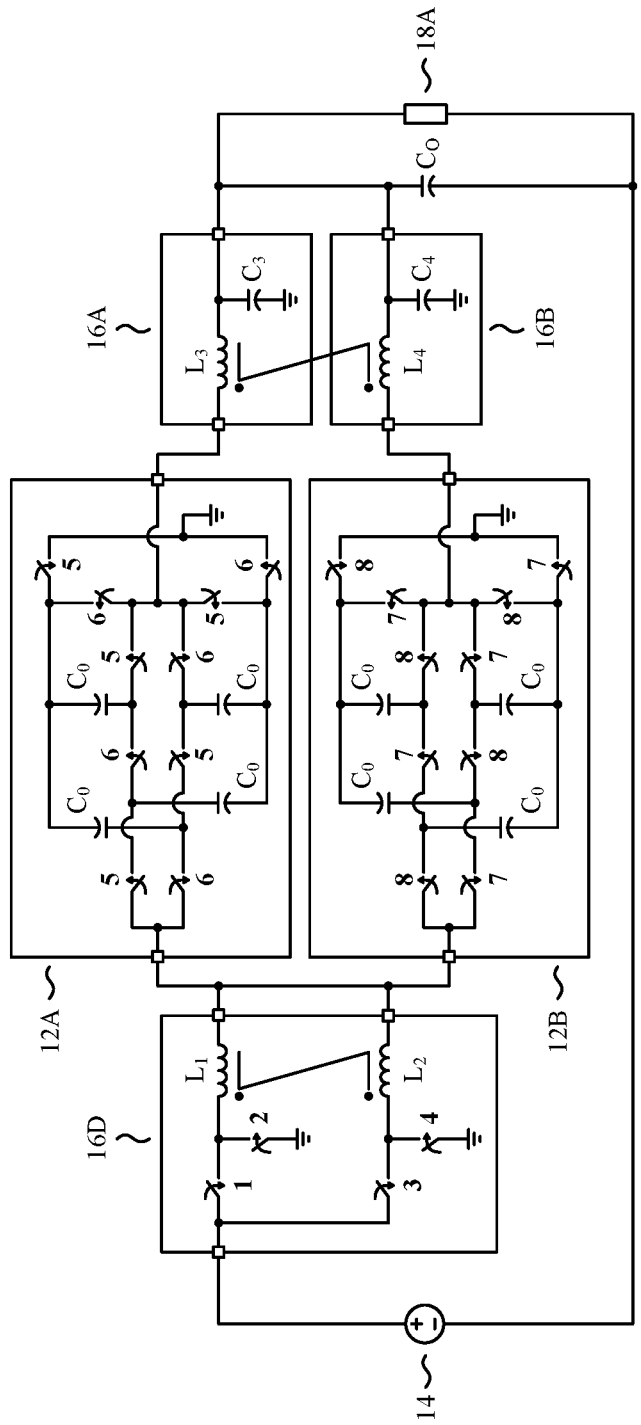
FIG. 37 shows an implementation of a DC-DC converter similar to that shown in FIG. 6B.

FIG. 37 shows a step-down converter that conforms substantially to the architecture introduced by FIG. 6B. In this embodiment, a fourth regulating circuit 16D has coupled inductors $L_1$, $L_2$. The fourth regulating circuit 16D regulates first and second switching networks 12A, 12B in parallel that operate 90° out of phase. The task of constraining charge transfer among the four capacitors $C_0$ of the first and second switching network 12A, 12B is shared by first and second regulating circuits 16A, 16B that also share coupled inductors $L_3$, $L_4$. If the coupling factor of the coupled inductors L3, $L_4$ is set properly, the ripple current through these inductors can be reduced. Thus, FIG. 37 illustrates the possibility of coupled inductors $L_1$, $L_2$ within one component, namely the fourth regulating circuit 16D, and the possibility, already alluded to in FIG. 6B, of coupled inductors $L_3$, $L_4$ across separate components, namely the first and second regulating circuits 16A, 16B.

It should be understood that the topology of the regulating circuit can be any type of power converter with the ability to regulate the output voltage, including, but without limitation, synchronous buck, three-level synchronous buck, SEPIC, magnetic filters, and soft switched or resonant converters. Similarly, the switching networks can be realized with a variety of switched capacitor topologies, depending on desired voltage transformation and permitted switch voltage.

In some implementations, a computer accessible storage medium includes a database representative of one or more components of the converter. For example, the database may include data representative of a switching network that has been optimized to promote low-loss operation of a charge pump.

Generally speaking, a computer accessible storage medium may include any non-transitory storage media accessible by a computer during use to provide instructions and/or data to the computer. For example, a computer accessible storage medium may include storage media such as magnetic or optical disks and semiconductor memories.

Generally, a database representative of the system may be a database or other data structure that can be read by a program and used, directly or indirectly, to fabricate the hardware comprising the system. For example, the database may be a behavioral-level description or register-transfer level (RTL) description of the hardware functionality in a high level design language (HDL) such as Verilog or VHDL. The description may be read by a synthesis tool that may synthesize the description to produce a netlist comprising a list of gates from a synthesis library. The netlist comprises a set of gates that also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, Alternatively, the database may itself be the netlist (with or without the synthesis library) or the data set.

Having described one or more preferred embodiments, it will be apparent to those of ordinary skill in the art that other embodiments incorporating these circuits, techniques and concepts may be used. Accordingly, it is submitted that the scope of the patent should not be limited to the described embodiments, but rather, should be limited only by the spirit and scope of the appended claims.

The invention claimed is:

1. An apparatus for processing electric power, said apparatus comprising a power-converter having first and second power-converter terminals connected by a path for power flow therebetween, wherein said first and second power-converter terminals, during operation are maintained at corresponding first and second voltages, said second voltage being lower than said first voltage, said power path comprising first and second regulating-circuit terminals configured to connect to corresponding first and second regulating-circuits, said first regulating-circuit comprising a first magnetic-storage element, and a switching network disposed on said path, said switching network comprising switches, a first charge-storage-element, and first and second switching-network-terminals connected to said first and second regulating-circuit terminals respectively, wherein said switching network is configured to transition between a first switch-configuration, during which charge accumulates in said first charge-storage element at a first rate, and a second switch-configuration, during which charge is depleted from said first charge-storage element at a second rate, said first and second rates being constrained by said first magnetic-storage-element.

2. The apparatus of claim 1, wherein said switching network further comprises a second charge-storage-element, wherein, when said switching network is in said first switch-configuration, charge is depleted from said second charge-storage-element at a first rate, and wherein, when said switching network is in said second configuration, charge accumulates in said second charge-storage-element at a second rate, wherein said first and second rates are both constrained by said first magnetic-storage-element.

3. The apparatus of claim 1, wherein said second regulating-circuit comprises a second magnetic-storage-element and a switch connected to said second magnetic-storage-element, said switch being controllable to switch between at least two switching configurations.

4. The apparatus of claim 1, wherein said second regulating-circuit further comprises a feedback loop for controlling operation of said switch in response to a measured output of said power converter.

5. The apparatus of claim 1, wherein said first magnetic-storage-element comprises a filter having a resonant frequency.

6. The apparatus of claim 1, wherein said switching network connects to third regulating-circuit that comprises an inductor that is coupled to an inductor in said second regulating-circuit.

7. The apparatus of claim 1, wherein said switching network connects to a third regulating-circuit and wherein inductors in said second and third regulating circuits share an inductor core.

8. The apparatus of claim 1, wherein said first rate and said second rate are equal.

9. The apparatus of claim 1, wherein said switching network is reconfigurable for operation with different switch-configurations, each of which causes a different voltage-transformation ratio.

10. The apparatus of claim 1, wherein said switching network comprises a multi-phase switching-network, wherein, during operation, power is transferred across said switching network through corresponding first and second charge-transfer paths extending across said switching network.

11. The apparatus of claim 1, wherein said switching network comprises a cascade multiplier.

12. The apparatus of claim 1, wherein at least one of said first and second regulating-circuits comprises a regulating circuit selected from the group consisting of a bidirectional regulating-circuit and a multi-phase regulating circuit.

13. The apparatus of claim 1, wherein at least one of said first and second regulating-circuits is selected from the group consisting of a switch-mode power converter and a resonant power converter.

14. The apparatus of claim 1, at least one of said first and second regulating-circuits comprises a magnetic filter.

15. The apparatus of claim 1, wherein said switching network is configured as an AC switching network.

16. The apparatus of claim 1, further comprising a power-factor correction circuit connected to switching network, said switching network being configured for AC operation.

17. The apparatus of claim 1, further comprising a power-factor correction circuit connected to switching network, said switching network being configured for AC operation, wherein said power-factor correction circuit is connected between said switching network and said first regulating-circuit.

18. The apparatus of claim 1, wherein said power-converter is configured to vary switch configurations of said switching network at a frequency that is different from a frequency at which switching configuration of at least one of said first and second regulating-circuits is varied.

19. The apparatus of claim 1, wherein, during operation, there exist times during which said first charge-storage element is charging while said second charge-storage element is discharging and times during which said first charge-storage element is discharging while said second charge-storage element is charging.

20. An apparatus for processing electric power, said apparatus comprising a power-converter having first and second power-converter terminals connected by a path for power flow therebetween, wherein said first and second power-converter terminals, during operation are maintained at corresponding first and second voltages, said second voltage being lower than said first voltage, said path comprising regulating-circuit terminals configured to connect to a circuit that participates in regulating an output of said power converter, said circuit comprising a magnetic-storage element having first and second terminals, wherein said power-converter further comprises a switching network comprising first and fourth switches that connect to a first charge-storage element and second and third switches that connect to a second charge-storage element, wherein, there exist times during which said first charge-storage element is connected to said first terminal of said magnetic-storage element and times during which said second charge-storage element is connected to said first terminal of said magnetic-storage element, wherein a third charge-storage element connects to said second terminal of said magnetic-storage element, wherein said switching network is connected to said circuit, wherein said switching network is configured to transition between a first switch-configuration, during which charge accumulates in said first charge-storage element at a first rate, and a second switch-configuration, during which charge is depleted from said first charge-storage element at a second rate, and wherein at least one of said first and second rates is constrained by said magnetic-storage-element.

* * * * *